(12) United States Patent
Pederson

(10) Patent No.: US 9,294,198 B2
(45) Date of Patent: *Mar. 22, 2016

(54) PULSED LIGHT COMMUNICATION KEY

(71) Applicant: Federal Law Enforcement Development Services, Inc., St. Cloud, MN (US)

(72) Inventor: John C. Pederson, Merritt Island, FL (US)

(73) Assignee: Federal Law Enforcement Development Services, Inc., St. Cloud, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/208,090

(22) Filed: Mar. 13, 2014

(65) Prior Publication Data

US 2014/0308045 A1    Oct. 16, 2014

Related U.S. Application Data

(63) Continuation-in-part of application No. 12/126,227, filed on May 23, 2008, now Pat. No. 8,687,965.

(60) Provisional application No. 61/778,672, filed on Mar. 13, 2013, provisional application No. 60/931,611, (Continued)

(51) Int. Cl.
*H04B 10/00* (2013.01)
*H04B 10/40* (2013.01)
(Continued)

(52) U.S. Cl.
CPC .............. *H04B 10/40* (2013.01); *H04B 10/116* (2013.01); *H04B 10/1143* (2013.01); *H04B 10/1149* (2013.01); *H05B 37/0272* (2013.01)

(58) Field of Classification Search
CPC ...... H04B 10/116; H04B 10/40; H04B 10/00; H04B 10/1143; H04B 10/1149; H04B 10/508; H04B 1/385; H04R 23/002; H05B 37/0272
USPC ........... 398/135, 138, 139, 140, 88, 201, 207, 398/168–171, 128, 172, 164
See application file for complete search history.

(56) References Cited

U.S. PATENT DOCUMENTS

| 700,678 | A | 5/1902 | Downie |
| 2,082,279 | A | 6/1937 | Fore |

(Continued)

FOREIGN PATENT DOCUMENTS

| AU | 2006201345 | 10/2007 |
| AU | 2007202909 | 2/2008 |

(Continued)

OTHER PUBLICATIONS

Akhavan et al., "High-Speed Power-Efficient Indoor Wireless Infrared Communication Using Code Combining—Part I," IEEE Trnsactions on Communications, vol. 50, No. 7, Jul. 2002, pp. 1098-1109.

(Continued)

*Primary Examiner* — Hibret Woldekidan
(74) *Attorney, Agent, or Firm* — Vidas, Arrett & Steinkraus, P.A.

(57) ABSTRACT

A Universal Serial Bus (USB) key may include an optical transceiver having a USB interface for engagement to an electronic device such as a laptop computer or other USB-configured device. The USB key may include a converter or buffering, isolation, modulation or amplification circuitry. The USB key sends and receives data signals which may be carried upon an optical transmission as generated by an LED light source which in turn is in communication with a host device such as a network processor. The USB key may also include operational amplifiers (op-amps) and transistor amplifiers.

15 Claims, 22 Drawing Sheets

Related U.S. Application Data filed on May 24, 2007, provisional application No. 61/867,731, filed on Aug. 20, 2013, provisional application No. 61/927,663, filed on Jan. 15, 2014, provisional application No. 61/927,638, filed on Jan. 15, 2014.

(51) Int. Cl.
   *H04B 10/116* (2013.01)
   *H04B 10/114* (2013.01)
   *H05B 37/02* (2006.01)

(56) References Cited

U.S. PATENT DOCUMENTS

| | | |
|---|---|---|
| 3,469,686 A | 9/1969 | Gutsche et al. |
| 3,701,043 A | 10/1972 | Zuleeg et al. |
| 3,705,316 A | 12/1972 | Burrous et al. |
| 3,863,075 A | 1/1975 | Ironmonger et al. |
| 3,867,718 A | 2/1975 | Moe |
| 3,889,147 A | 6/1975 | Groves |
| 3,911,430 A | 10/1975 | Jankowski et al. |
| 4,149,111 A | 4/1979 | Coates, Jr. |
| 4,243,985 A | 1/1981 | Quayle |
| 4,254,453 A | 3/1981 | Mouyard |
| 4,271,408 A | 6/1981 | Teshima |
| 4,298,806 A | 11/1981 | Herold |
| 4,301,461 A | 11/1981 | Asano |
| 4,319,306 A | 3/1982 | Stanuch |
| 4,336,580 A | 6/1982 | Mouyard |
| 4,342,944 A | 8/1982 | SpringThorpe |
| 4,368,979 A | 1/1983 | Ruell |
| 4,390,931 A | 6/1983 | Gorick |
| 4,434,510 A | 2/1984 | Lemelson |
| 4,445,132 A | 4/1984 | Ichikawa |
| 4,556,862 A | 12/1985 | Meinershagen |
| 4,595,904 A | 6/1986 | Gosswiller |
| 4,598,198 A | 7/1986 | Fayfield |
| 4,614,866 A | 9/1986 | Liss |
| 4,615,131 A | 10/1986 | Wakatake |
| 4,616,225 A | 10/1986 | Woudenberg |
| 4,630,180 A | 12/1986 | Muraki |
| 4,630,183 A | 12/1986 | Fujita |
| 4,633,280 A | 12/1986 | Takasu |
| 4,654,629 A | 3/1987 | Bezos |
| 4,703,219 A | 10/1987 | Mesquida |
| 4,710,977 A | 12/1987 | Lemelson |
| 4,716,296 A | 12/1987 | Bussiere |
| 4,720,835 A | 1/1988 | Akiba |
| 4,724,312 A | 2/1988 | Snaper |
| 4,742,432 A | 5/1988 | Thillays |
| 4,799,135 A | 1/1989 | Inukai |
| 4,821,118 A | 4/1989 | Lafreniere |
| 4,821,338 A | 4/1989 | Naruse |
| 4,868,719 A | 9/1989 | Kouchi |
| 4,900,970 A | 2/1990 | Ando |
| 4,918,497 A | 4/1990 | Edmond |
| 4,928,084 A | 5/1990 | Reiser |
| 4,929,866 A | 5/1990 | Murata |
| 4,935,665 A | 6/1990 | Murata |
| 4,949,866 A | 8/1990 | Sanders |
| 4,954,822 A | 9/1990 | Borenstein |
| 4,965,644 A | 10/1990 | Kawabata |
| 4,966,862 A | 10/1990 | Edmond |
| 4,975,644 A | 12/1990 | Fox |
| 4,975,814 A | 12/1990 | Schairer |
| 4,990,970 A | 2/1991 | Fuller |
| 5,000,569 A | 3/1991 | Nylund |
| 5,027,168 A | 6/1991 | Edmond |
| 5,035,055 A | 7/1991 | McCullough |
| 5,038,406 A | 8/1991 | Titterton |
| 5,041,947 A | 8/1991 | Yuen |
| 5,045,767 A | 9/1991 | Wakatake |
| 5,050,055 A | 9/1991 | Lindsay |
| 5,057,828 A | 10/1991 | Rousseau |
| 5,060,303 A | 10/1991 | Wilmoth |
| 5,062,152 A | 10/1991 | Faulkner |
| 5,067,788 A | 11/1991 | Jannson |
| 5,091,828 A | 2/1992 | Jincks |
| D324,921 S | 3/1992 | Stanuch |
| 5,093,768 A | 3/1992 | Ohe |
| 5,097,397 A | 3/1992 | Stanuch |
| 5,097,612 A | 3/1992 | Williams |
| 5,101,326 A | 3/1992 | Roney |
| 5,122,943 A | 6/1992 | Pugh |
| 5,136,287 A | 8/1992 | Borenstein |
| 5,159,486 A | 10/1992 | Webb |
| 5,164,992 A | 11/1992 | Turk |
| 5,172,113 A | 12/1992 | Hamer |
| 5,182,647 A | 1/1993 | Chang |
| 5,187,547 A | 2/1993 | Niina |
| 5,193,201 A | 3/1993 | Tymes |
| 5,198,746 A | 3/1993 | Gyugyi |
| 5,198,756 A | 3/1993 | Jenkins |
| 5,220,235 A | 6/1993 | Wakimizu |
| 5,224,773 A | 7/1993 | Arimura |
| 5,233,204 A | 8/1993 | Fletcher |
| 5,235,498 A | 8/1993 | VanDulmen |
| 5,283,425 A | 2/1994 | Imamura |
| 5,291,196 A | 3/1994 | Defour |
| 5,296,840 A | 3/1994 | Gieffers |
| 5,298,738 A | 3/1994 | Gebert |
| 5,302,965 A | 4/1994 | Belcher |
| 5,313,187 A | 5/1994 | Choi |
| 5,321,593 A | 6/1994 | Moates |
| 5,357,123 A | 10/1994 | Sugawara |
| 5,357,409 A | 10/1994 | Glatt |
| 5,359,255 A | 10/1994 | Kawai |
| 5,359,669 A | 10/1994 | Shanley |
| 5,361,190 A | 11/1994 | Roberts |
| 5,362,971 A | 11/1994 | McMahon |
| 5,381,155 A | 1/1995 | Gerber |
| 5,400,140 A | 3/1995 | Johnston |
| 5,401,328 A | 3/1995 | Schmitz |
| 5,403,916 A | 4/1995 | Watanabe |
| 5,406,095 A | 4/1995 | Koyama |
| 5,410,328 A | 4/1995 | Yoksza |
| 5,410,453 A | 4/1995 | Ruskouski |
| 5,416,627 A | 5/1995 | Wilmoth |
| 5,419,065 A | 5/1995 | Lin |
| 5,420,444 A | 5/1995 | Sawase |
| 5,422,623 A | 6/1995 | Bader |
| 5,426,417 A | 6/1995 | Stanuch |
| 5,434,693 A | 7/1995 | Tanaka |
| 5,436,809 A | 7/1995 | Brassier |
| 5,450,301 A | 9/1995 | Waltz |
| 5,453,729 A | 9/1995 | Chu |
| 5,465,142 A | 11/1995 | Krumes |
| 5,471,371 A | 11/1995 | Koppolu |
| 5,475,241 A | 12/1995 | Harrah |
| 5,482,896 A | 1/1996 | Tang |
| 5,490,048 A | 2/1996 | Brassier |
| 5,490,049 A | 2/1996 | Montalan |
| 5,491,350 A | 2/1996 | Unno |
| 5,498,883 A | 3/1996 | Lebby |
| 5,514,627 A | 5/1996 | Lowery |
| 5,516,727 A | 5/1996 | Broom |
| 5,519,720 A | 5/1996 | Hirano |
| 5,526,237 A | 6/1996 | Davenport |
| 5,528,474 A | 6/1996 | Roney |
| 5,532,472 A | 7/1996 | Furuta |
| 5,546,219 A | 8/1996 | Iida |
| 5,546,496 A | 8/1996 | Kimoto |
| 5,552,780 A | 9/1996 | Knockeart |
| 5,557,257 A | 9/1996 | Gieffers |
| 5,567,036 A | 10/1996 | Theobald |
| 5,568,406 A | 10/1996 | Gerber |
| 5,569,939 A | 10/1996 | Choi |
| 5,575,459 A | 11/1996 | Anderson |
| 5,580,156 A | 12/1996 | Suzuki |
| 5,585,783 A | 12/1996 | Hall |
| 5,593,223 A | 1/1997 | Koizumi |
| 5,593,459 A | 1/1997 | Gamblin |
| 5,594,415 A | 1/1997 | Ishikawa |

(56) References Cited

U.S. PATENT DOCUMENTS

| | | |
|---|---|---|
| 5,598,290 A | 1/1997 | Tanaka |
| 5,604,480 A | 2/1997 | Lamparter |
| 5,606,444 A | 2/1997 | Johnson |
| 5,607,788 A | 3/1997 | Tomazic |
| 5,612,201 A | 3/1997 | DePlaen |
| 5,612,231 A | 3/1997 | Holm |
| 5,625,201 A | 4/1997 | Holm |
| 5,627,851 A | 5/1997 | Takahashi |
| 5,631,474 A | 5/1997 | Saitoh |
| 5,632,551 A | 5/1997 | Roney |
| 5,633,629 A | 5/1997 | Hochstein |
| 5,634,287 A | 6/1997 | Lamparter |
| 5,634,357 A | 6/1997 | Nutter |
| 5,634,711 A | 6/1997 | Kennedy |
| 5,635,902 A | 6/1997 | Hochstein |
| 5,635,981 A | 6/1997 | Ribacoff |
| 5,636,916 A | 6/1997 | Sokolowski |
| 5,643,357 A | 7/1997 | Breton |
| 5,644,291 A | 7/1997 | Jozwik |
| 5,656,829 A | 8/1997 | Sakaguchi |
| 5,660,461 A | 8/1997 | Ignatius |
| 5,661,645 A | 8/1997 | Hochstein |
| 5,661,742 A | 8/1997 | Huang |
| 5,664,448 A | 9/1997 | Swan |
| 5,674,000 A | 10/1997 | Kalley |
| 5,694,112 A | 12/1997 | VannRox |
| 5,696,500 A | 12/1997 | Diem |
| 5,697,175 A | 12/1997 | Schwartz |
| 5,705,047 A | 1/1998 | Lee |
| 5,707,891 A | 1/1998 | Izumi |
| 5,708,428 A | 1/1998 | Phillips |
| 5,722,760 A | 3/1998 | Chien |
| 5,726,535 A | 3/1998 | Yan |
| 5,726,786 A | 3/1998 | Heflinger |
| 5,734,337 A | 3/1998 | Kupersmit |
| 5,734,343 A | 3/1998 | Urbish |
| 5,736,925 A | 4/1998 | Knauff |
| 5,739,552 A | 4/1998 | Kimura |
| 5,739,592 A | 4/1998 | Rigsby |
| 5,758,947 A | 6/1998 | Glatt |
| 5,760,531 A | 6/1998 | Pederson |
| 5,781,105 A | 7/1998 | Bitar |
| 5,785,418 A | 7/1998 | Hochstein |
| 5,786,918 A | 7/1998 | Suzuki |
| 5,789,768 A | 8/1998 | Lee |
| 5,793,062 A | 8/1998 | Kish, Jr. |
| 5,796,376 A | 8/1998 | Banks |
| 5,804,822 A | 9/1998 | Brass |
| 5,805,081 A | 9/1998 | Fikacek |
| 5,805,209 A | 9/1998 | Yuge |
| 5,806,965 A | 9/1998 | Deese |
| 5,808,592 A | 9/1998 | Mizutani |
| 5,809,161 A | 9/1998 | Auty |
| 5,809,681 A | 9/1998 | Miyamoto |
| 5,810,833 A | 9/1998 | Brady |
| 5,818,421 A | 10/1998 | Ogino |
| 5,826,965 A | 10/1998 | Lyons |
| 5,828,055 A | 10/1998 | Jebens |
| 5,831,155 A | 11/1998 | Hewitt |
| 5,838,024 A | 11/1998 | Masuda |
| 5,838,116 A | 11/1998 | Katyl |
| 5,838,247 A | 11/1998 | Bladowski |
| 5,838,259 A | 11/1998 | Tonkin |
| 5,848,837 A | 12/1998 | Gustafson |
| 5,860,135 A | 1/1999 | Sugita |
| 5,872,646 A | 2/1999 | Alderman |
| 5,875,261 A | 2/1999 | Fitzpatrick |
| 5,884,997 A | 3/1999 | Stanuch |
| 5,898,381 A | 4/1999 | Gartner |
| 5,900,850 A | 5/1999 | Bailey |
| 5,917,637 A | 6/1999 | Ishikawa |
| 5,929,788 A | 7/1999 | Vukosic |
| 5,931,562 A | 8/1999 | Arato |
| 5,931,570 A | 8/1999 | Yamuro |
| 5,932,860 A | 8/1999 | Plesko |
| 5,934,694 A | 8/1999 | Schugt |
| 5,936,417 A | 8/1999 | Nagata |
| 5,939,996 A | 8/1999 | Kniveton |
| 5,948,038 A | 9/1999 | Daly |
| 5,959,752 A | 9/1999 | Ota |
| 5,960,135 A | 9/1999 | Ozawa |
| 5,965,879 A | 10/1999 | Leviton |
| 5,966,073 A | 10/1999 | Walton |
| 5,975,714 A | 11/1999 | Vetorino |
| 5,990,802 A | 11/1999 | Maskeny |
| 5,991,085 A | 11/1999 | Rallison |
| 6,009,650 A | 1/2000 | Lamparter |
| 6,014,237 A | 1/2000 | Abeles |
| 6,018,899 A | 2/2000 | Hanitz |
| 6,028,694 A | 2/2000 | Schmidt |
| 6,035,053 A | 3/2000 | Yoshioka |
| 6,035,055 A | 3/2000 | Wang |
| 6,035,074 A | 3/2000 | Fujimoto |
| 6,067,010 A | 5/2000 | Wang |
| 6,067,011 A | 5/2000 | Leslie |
| 6,067,018 A | 5/2000 | Skelton |
| 6,072,893 A | 6/2000 | Luo |
| 6,081,206 A | 6/2000 | Kielland |
| 6,081,304 A | 6/2000 | Kuriyama |
| 6,086,229 A | 7/2000 | Pastrick |
| 6,091,025 A | 7/2000 | Cotter |
| 6,094,148 A | 7/2000 | Henry |
| 6,095,661 A | 8/2000 | Lebens |
| 6,095,663 A | 8/2000 | Pond |
| 6,102,696 A | 8/2000 | Osterwalder |
| 6,106,137 A | 8/2000 | Adams |
| 6,111,671 A | 8/2000 | Bahuguna |
| 6,118,388 A | 9/2000 | Morrison |
| 6,121,898 A | 9/2000 | Moetteli |
| 6,126,087 A | 10/2000 | Hedger |
| 6,159,005 A | 12/2000 | Herold |
| 6,166,496 A | 12/2000 | Lys |
| 6,177,678 B1 | 1/2001 | Brass |
| 6,183,100 B1 | 2/2001 | Suckow |
| 6,188,738 B1 | 2/2001 | Sakamoto |
| 6,243,492 B1 | 6/2001 | Kamei |
| 6,249,340 B1 | 6/2001 | Jung |
| 6,268,788 B1 | 7/2001 | Gray |
| 6,271,814 B1 | 8/2001 | Kaoh |
| 6,271,815 B1 | 8/2001 | Yang |
| 6,271,913 B1 | 8/2001 | Jung |
| 6,292,575 B1 | 9/2001 | Bortolussi |
| 6,293,904 B1 | 9/2001 | Blazey |
| 6,318,886 B1 | 11/2001 | Stopa |
| 6,352,358 B1 | 3/2002 | Lieberman |
| 6,367,949 B1 | 4/2002 | Pederson |
| 6,369,849 B1 | 4/2002 | Rzyski |
| 6,377,558 B1 | 4/2002 | Dent |
| 6,380,865 B1 | 4/2002 | Pederson |
| 6,389,115 B1 | 5/2002 | Swistock |
| 6,389,155 B2 | 5/2002 | Funayama |
| 6,396,954 B1 | 5/2002 | Kondo |
| 6,400,828 B2 | 6/2002 | Covell |
| 6,411,022 B1 | 6/2002 | Machida |
| 6,424,269 B1 | 7/2002 | Pederson |
| 6,426,599 B1 | 7/2002 | Leeb |
| 6,461,008 B1 | 10/2002 | Pederson |
| 6,462,669 B1 | 10/2002 | Pederson |
| 6,469,631 B1 | 10/2002 | Pederson |
| 6,472,996 B1 | 10/2002 | Pederson |
| 6,476,726 B1 | 11/2002 | Pederson |
| 6,504,487 B1 | 1/2003 | Pederson |
| 6,532,212 B1 | 3/2003 | Soloway |
| 6,547,410 B1 | 4/2003 | Pederson |
| 6,548,967 B1 * | 4/2003 | Dowling et al. ............ 315/318 |
| 6,590,343 B2 | 7/2003 | Pederson |
| 6,590,502 B1 | 7/2003 | Pederson |
| 6,600,274 B1 | 7/2003 | Hughes |
| 6,600,899 B1 | 7/2003 | Radomsky |
| 6,614,359 B2 | 9/2003 | Pederson |
| 6,623,151 B2 | 9/2003 | Pederson |
| 6,683,590 B1 | 1/2004 | Pang |
| 6,690,294 B1 | 2/2004 | Zierden |
| 6,693,551 B2 | 2/2004 | Pederson |

(56) References Cited

U.S. PATENT DOCUMENTS

| | | |
|---|---|---|
| 6,705,745 B1 | 3/2004 | Pederson |
| 6,707,389 B2 | 3/2004 | Pederson |
| 6,788,217 B2 | 9/2004 | Pederson |
| 6,814,459 B2 | 11/2004 | Pederson |
| 6,819,654 B2 | 11/2004 | Soloway |
| 6,819,677 B1 | 11/2004 | Nouzovsky |
| 6,822,578 B2 | 11/2004 | Pederson |
| 6,844,824 B2 | 1/2005 | Vukosic |
| 6,879,263 B2 | 4/2005 | Pederson |
| 6,892,942 B1 | 5/2005 | Widl |
| 7,006,768 B1 | 2/2006 | Franklin |
| 7,023,469 B1 | 4/2006 | Olson |
| 7,046,160 B2 | 5/2006 | Pederson |
| 7,102,665 B1 | 9/2006 | Chandler |
| 7,103,614 B1 | 9/2006 | Kucik |
| 7,183,895 B2 | 2/2007 | Bazakos |
| 7,230,884 B2 | 6/2007 | Shemesh |
| 7,289,731 B2* | 10/2007 | Thinguldstad ............... 398/66 |
| 7,309,965 B2 | 12/2007 | Dowling |
| 7,321,757 B2 | 1/2008 | Yamashita |
| 7,323,991 B1 | 1/2008 | Eckert |
| 7,324,757 B2* | 1/2008 | Wilson et al. ............... 398/116 |
| 7,352,972 B2 | 4/2008 | Franklin |
| 7,439,847 B2 | 10/2008 | Pederson |
| 7,439,874 B2 | 10/2008 | Sotiriou |
| 7,529,488 B2 | 5/2009 | Burdick |
| 7,548,698 B2 | 6/2009 | Yamamoto |
| 7,557,521 B2 | 7/2009 | Lys |
| 7,583,901 B2 | 9/2009 | Nakagawa |
| 7,689,130 B2 | 3/2010 | Ashdown |
| 7,912,377 B2 | 3/2011 | Koga |
| 7,940,191 B2 | 5/2011 | Hierzer |
| 8,126,554 B2 | 2/2012 | Kane |
| 8,175,799 B1 | 5/2012 | Woehler |
| 8,188,878 B2* | 5/2012 | Pederson et al. ......... 340/815.45 |
| 8,188,879 B2 | 5/2012 | Pederson |
| 8,207,821 B2 | 6/2012 | Roberge |
| 8,421,588 B1 | 4/2013 | Ross |
| 8,538,692 B2 | 9/2013 | Wurman |
| 8,571,411 B2* | 10/2013 | Pederson et al. ............... 398/115 |
| 8,593,299 B2 | 11/2013 | Pederson |
| 8,687,965 B2* | 4/2014 | Pederson et al. ............... 398/135 |
| 8,729,833 B2 | 5/2014 | Chemel |
| 8,744,267 B2* | 6/2014 | Pederson ............... 398/127 |
| 8,886,045 B2* | 11/2014 | Pederson et al. ............... 398/115 |
| 8,890,773 B1 | 11/2014 | Pederson |
| 8,902,076 B2 | 12/2014 | Pederson |
| 2002/0109892 A1 | 8/2002 | Seto |
| 2002/0168958 A1 | 11/2002 | Ford |
| 2003/0025608 A1 | 2/2003 | Pederson |
| 2003/0118216 A1 | 6/2003 | Goldberg |
| 2003/0156037 A1 | 8/2003 | Pederson |
| 2003/0169164 A1 | 9/2003 | Lau |
| 2003/0185340 A1 | 10/2003 | Frantz |
| 2003/0212996 A1 | 11/2003 | Wolzien |
| 2003/0222587 A1 | 12/2003 | Dowling |
| 2004/0028349 A1* | 2/2004 | Nagasaka et al. ............... 385/88 |
| 2004/0044709 A1 | 3/2004 | Cabrera |
| 2004/0101312 A1 | 5/2004 | Cabrera |
| 2004/0151344 A1 | 8/2004 | Farmer |
| 2004/0153229 A1 | 8/2004 | Gokturk |
| 2004/0208599 A1 | 10/2004 | Swartz |
| 2005/0002673 A1 | 1/2005 | Okano |
| 2005/0005794 A1 | 1/2005 | Inukai |
| 2005/0057941 A1 | 3/2005 | Pederson |
| 2005/0111700 A1 | 5/2005 | OBoyle |
| 2005/0169643 A1 | 8/2005 | Franklin |
| 2005/0231128 A1 | 10/2005 | Franklin |
| 2006/0039698 A1 | 2/2006 | Pautler |
| 2006/0056855 A1* | 3/2006 | Nakagawa et al. ............ 398/183 |
| 2006/0132382 A1 | 6/2006 | Jannard |
| 2006/0149813 A1 | 7/2006 | Janik |
| 2006/0192672 A1 | 8/2006 | Gidge |
| 2006/0193634 A1 | 8/2006 | Wang |
| 2006/0213731 A1 | 9/2006 | Lesesky |
| 2006/0238368 A1 | 10/2006 | Pederson |
| 2006/0275040 A1 | 12/2006 | Franklin |
| 2007/0041732 A1 | 2/2007 | Oki et al. |
| 2007/0104239 A1 | 5/2007 | Koga |
| 2007/0110446 A1 | 5/2007 | Hong |
| 2007/0145915 A1 | 6/2007 | Roberge |
| 2007/0147843 A1* | 6/2007 | Fujiwara ............... 398/118 |
| 2007/0160373 A1 | 7/2007 | Biegelsen |
| 2007/0165244 A1 | 7/2007 | Yukhin |
| 2007/0195263 A1* | 8/2007 | Shimizu et al. ............... 351/168 |
| 2007/0269219 A1* | 11/2007 | Teller et al. ............... 398/140 |
| 2007/0294029 A1 | 12/2007 | DAndrea |
| 2008/0044188 A1 | 2/2008 | Kagawa |
| 2008/0063404 A1 | 3/2008 | Broyde |
| 2008/0138077 A1 | 6/2008 | Stretton |
| 2008/0154101 A1 | 6/2008 | Jain |
| 2008/0170536 A1 | 7/2008 | Marshack |
| 2008/0227463 A1 | 9/2008 | Hizume |
| 2008/0292320 A1 | 11/2008 | Pederson |
| 2009/0002265 A1 | 1/2009 | Kitaoka |
| 2009/0102396 A1 | 4/2009 | Petrucci |
| 2009/0129782 A1* | 5/2009 | Pederson ............... 398/135 |
| 2009/0157545 A1 | 6/2009 | Mobley |
| 2009/0262760 A1 | 10/2009 | Krupkin |
| 2009/0315481 A1 | 12/2009 | Zhao |
| 2009/0315485 A1 | 12/2009 | Verfuerth |
| 2010/0111538 A1 | 5/2010 | Arita |
| 2010/0209105 A1 | 8/2010 | Shin |
| 2011/0006898 A1 | 1/2011 | Kruest |
| 2012/0202520 A1 | 8/2012 | George |
| 2012/0230696 A1 | 9/2012 | Pederson |
| 2013/0221848 A1 | 8/2013 | Miesak |
| 2014/0153923 A1 | 6/2014 | Casaccia |
| 2015/0086213 A1* | 3/2015 | Pederson et al. ............... 398/128 |

FOREIGN PATENT DOCUMENTS

| | | |
|---|---|---|
| CA | 2164920 | 6/1996 |
| DE | 4304216 | 8/1994 |
| DE | 19502735 | 8/1996 |
| DE | 19548639 | 6/1997 |
| DE | 19721673 | 11/1997 |
| DE | 29712281 | 1/1998 |
| EP | 0326668 | 8/1989 |
| EP | 0468822 | 1/1992 |
| EP | 0531184 | 3/1993 |
| EP | 0531185 | 3/1993 |
| EP | 0596782 | 5/1994 |
| EP | 0633163 | 1/1995 |
| EP | 0688696 | 12/1995 |
| EP | 0709818 | 5/1996 |
| EP | 0793403 | 9/1997 |
| EP | 0887783 | 12/1998 |
| EP | 0890894 | 1/1999 |
| EP | 0896898 | 2/1999 |
| EP | 0967590 | 12/1999 |
| EP | 1043189 | 10/2000 |
| EP | 1205763 | 5/2002 |
| EP | 1564914 | 8/2005 |
| FR | 2658024 | 8/1991 |
| FR | 2680861 | 3/1993 |
| FR | 2707222 | 1/1995 |
| FR | 2800500 | 5/2001 |
| GB | 1241369 | 8/1971 |
| GB | 2069257 | 8/1981 |
| GB | 2139340 | 11/1984 |
| GB | 2175428 | 11/1986 |
| GB | 2240650 | 2/1990 |
| GB | 2111270 | 6/1993 |
| GB | 2272791 | 5/1994 |
| GB | 2292450 | 2/1996 |
| GB | 2311401 | 9/1997 |
| GB | 2323618 | 9/1998 |
| GB | 2330679 | 4/1999 |
| GB | 2359179 | 8/2001 |
| GB | 2359180 | 8/2001 |
| JP | 60143150 | 7/1985 |
| JP | S63153166 | 6/1988 |
| JP | 6333403 | 12/1994 |

(56) References Cited

FOREIGN PATENT DOCUMENTS

| JP | 06333403 | 12/1994 |
|---|---|---|
| JP | 08002341 | 1/1996 |
| JP | 8002341 | 1/1996 |
| JP | 10098778 | 4/1998 |
| WO | 9750070 | 12/1997 |
| WO | 9935634 | 7/1999 |
| WO | 9942985 | 8/1999 |
| WO | 9949435 | 9/1999 |
| WO | 9949446 | 9/1999 |
| WO | 0074975 | 12/2000 |
| WO | 0101675 | 1/2001 |
| WO | 0110674 | 2/2001 |
| WO | 0110675 | 2/2001 |
| WO | 0110676 | 2/2001 |
| WO | 0225842 | 3/2002 |
| WO | 02073836 | 9/2002 |
| WO | 2007003037 | 11/2007 |

OTHER PUBLICATIONS

Djahani et al., "Analysis of Infrared Wireless Links Employing Multibeam Transmitters and Imaging Diversity Receivers," IEEE Transactions on Communications, vol. 48, No. 12, Dec. 2000, pp. 2077-2088.

Hawaiian Electric Company, Inc.: Powerlines—Energy Efficiency Takes-off at Honolulu International Airport, Spring 2008, pp. 1-13.

Jeffrey B. Carruthers, "Wireless Infrared Communications," Wiley Encyclopedia of Telecommunications, 2002.

Kahn et al., "Wireless Infrared Communications," Proceedings of the IEEE, vol. 85, No. 2, Feb. 1997, pp. 265-298.

Komine T. et al., "Integrated System of White LED Visible-Light Communicaiton and Power-Line Communication," 20020915; 20020915-20020918, vol. 4, Sep. 15, 2002, pp. 1762-1766.

Pacific Northwest National Laboratory: Demonstration Assement of Light-Emitting Diode (LED) Parking Lot Lighting, Phase 1, Jun. 2010, pp. 1-37.

T. Komine and M. Nakagawa, Integrated System of White LED Visible-Light Communication and Power-Line Communication Integrated System of White LED Visible-Light Communication and Power-Line Communication, Toshihiko Komine, Student Member, IEEE and Masao Nakagawa, Member, IEEE Date 1, Feb. 2003 pp. 71-79.

Van Wicklen, Garrett L.: Using LED Lights Can Reduce Your Electricity Costs, Dec. 2005, Cooperative Extension Service, Applied Poultry Engineering News, vol. 3, No. 1, pp. 1-4.

* cited by examiner

PULSED LIGHT COMMUNICATION KEY

CROSS-REFERENCE TO RELATED APPLICATIONS

This application claims the benefit of Provisional Application No. 61/778,672, filed Mar. 13, 2013, the disclosure of which is expressly incorporated herein by reference. This application is also a Continuation-in-Part to Ser. No. 12/126,227, filed May 23, 2008 which claims priority to Provisional Application No. 60/931,611, filed May 24, 2007, the disclosure of which is expressly incorporated herein by reference. This application also claims the benefit of Provisional Application No. 61/867,731, filed Aug. 20, 2013, the disclosure of which is expressly incorporated herein by reference. This application also claims the benefit of Provisional Application No. 61/927,663, filed Jan. 15, 2014, the disclosure of which is expressly incorporated herein by reference. This application also claims the benefit of Provisional Application No. 61/927,638, filed Jan. 15, 2014, the disclosure of which is expressly incorporated herein by reference.

STATEMENT REGARDING FEDERALLY SPONSORED RESEARCH

Not Applicable

FIELD OF THE INVENTION

In some embodiments, the present invention is generally directed to light emitting diodes (LEDs) and applications thereof. In particular, some embodiments of the present invention are directed to using LEDs and LED interface devices in conjunction with power line communication technology to provide internet access and communication capability to residential and commercial clientele.

BACKGROUND OF THE INVENTION

Present communication techniques using wireless communication including radiofrequency transmissions (RF) raise security concerns because transmissions using RF can be easily intercepted, in part because of the fact that RF signals are designed to radiate signals in all directions. Second, radiofrequency transmissions may be regulated by the Federal Communications Commission (FCC) which may control the frequencies that may be used for RF transmission. Third, RF by its very nature is susceptible to interference and produces noise.

In contrast to RF communications, light sources used for communication are extremely secure due to the fact that they are focused within a narrow beam, requiring the placement of equipment within the beam itself for interception. Also, because the visible spectrum is not regulated by the FCC, light sources can be used for communications purposes without the need of a license. Light sources are also not susceptible to interference nor do they produce noise that can interfere with other devices.

Light emitting diodes (LEDs) may be used as light sources to provide data transmission, as described in U.S. Pat. Nos. 6,879,263 and 7,046,160, the entire contents of each being expressly incorporated herein by reference. LEDs have a quick response to "ON" and "OFF" signals, as compared to the longer warm-up and response times associated with fluorescent lighting, for example. LEDs are efficient in the production of light, as measured in lumens per watt. Recent developments in LED technology, such as high brightness blue LEDs, have paved the way for white LEDs, which have made LEDs a practical alternative to conventional light sources. As such, LED technology provides a practical opportunity to combine lighting and communication and information/data transmission. This combination of lighting, communication and data transmission allows ubiquitous light sources such as street lights, home lighting, and office building lighting, for example, to be converted to, or supplemented with, LED technology to provide for communications and dta transfer while simultaneously producing light for illumination purposes.

In addition to use as general lighting, LEDs can be used in networking applications. In any network, a variety of client devices will communicate with one or more host devices. The host may provide connection to a Local Area Network (LAN), sometimes referred to as an Intranet, owing to the common use of such a network entirely within an office space, building, or business. The host may additionally or alternatively provide connection to a Wide Area Network (WAN), commonly describing a network coupling widely separated physical locations which are connected together through any suitable connection, including for exemplary purposes but not solely limited thereto such means as fiber optic links, T1 lines, Radio Frequency (RF) links including cellular telecommunications links, satellite connections, DSL connections, or even Internet connections. Generally, where more public means such as the Internet are used, secured access will commonly separate the WAN from general Internet traffic. The host may further provide access to the Internet.

A variety of client devices have heretofore been enabled to connect to host devices. Such client devices may commonly include computing devices of all sorts, ranging from handheld devices such as Personal Digital Assistants (PDAs) to massive mainframe computers, and including Personal Computers (PCs). However, over time many more devices have been enabled for connection to network hosts, including for exemplary purposes printers, network storage devices, cameras, other security and safety devices, appliances, HVAC systems, manufacturing machinery, and so forth. Essentially, any device which incorporates or can be made to incorporate sufficient electronic circuitry may be so linked as a client to a host.

Existing client devices are designed to connect to host network access points through wired connections, like copper wire, for example, fiber optic connections, or as wireless connections, such as wireless routers. In the case of a wired system, whether through simple wire, twisted wire, co-axial cable, fiber optics or other line or link, the host and client are tethered together through this physical communications channel. The tether, as may be appreciated, limits movement of the client relative to the host, is often unsightly and hard to contain in a workspace. In addition, electrical connectors such as jacks must be provided, and these connectors necessarily limit the number of access points and locations.

In contrast, in the case of wireless routers, an RF signal replaces the physical communications channel with a radio channel. This advantageously eliminates the wire or fiber tether between client and host. Instead, client devices in a wireless system try through various broadcasts and signal receptions to find an access point that will have adequate transmission and reception, generally within a certain signal range which may range from a few meters to as many as several tens of meters. The systems are programmed to bridge from a host access point to various client devices through known exchanges of information, commonly described as communications protocols or handshakes. Depending upon the communications channel, a variety of client connection devices may be utilized such as PCMCIA or PC cards, serial ports, parallel ports, SIMM cards, USB connectors, Ethernet cards or connectors, firewire interfaces, Bluetooth compatible devices, infrared/IrDA devices, and other known or similar components.

The security of these prior art wireless devices may be compromised in that they are vulnerable to unauthorized access or interception, and the interception may be from a significant distance, extending often well beyond physical building and property boundaries.

The art referred to and/or described above is not intended to constitute an admission that any patent, publication or other information referred to herein is "prior art" with respect to this invention. In addition, this section should not be construed to mean that a search has been made or that no other pertinent information as defined in 37C.F.R. §1.56(a) exists.

All U.S. patents and applications and all other published documents mentioned anywhere in this application are incorporated herein by reference in their entirety.

Without limiting the scope of the invention, a brief summary of some of the claimed embodiments of the invention is set forth below. Additional details of the summarized embodiments of the invention and/or additional embodiments of the invention may be found in the Detailed Description of the Invention below. A brief abstract of the technical disclosure in the specification is provided for the purposes of complying with 37 C.F.R. §1.72.

GENERAL DESCRIPTION OF THE INVENTION

In some embodiments, there is provided a light emitting diode (LED) signal light and systematic information transfer through encrypted pulsed light communication and data transfer system which may be depicted in several embodiments. In general, the signal light and pulsed light communication system may be formed of a single row, single source, or an array of light emitting diode light sources configured on a light support and in electrical communication with a controller and a power supply, battery, or other electrical source. The signal light and pulsed light communication system may provide various light signals, colored light signals, or combination or patterns of light signals for use in association with the communication of data or information. These light signals may also be encoded. The signal light and pulsed light communication system may be easily transportable and may be conveniently connected to a device or structure for electrical coupling to a power supply, battery, or other electrical source as a remote stand-alone signaling or communication device.

Individual light supports as a portion of the communication system may be positioned adjacent to, and/or be in electrical communication with another light support, through the use of suitable electrical connections. Alternatively, individual light supports may be in communication with each other exclusively through the transmission and receipt of pulsed light signals.

A plurality of light supports or solitary light sources may be electrically coupled in either a parallel or series manner to a controller. The controller is also preferably in electrical communication with the power supply and the LED's, to regulate or modulate the light intensity for the LED light sources. The individual LED's and/or arrays of LED's may be used for transmission of data or communication packets formed of light signals.

The controller for the LED light support may generate and/or recognize pulsed light signals used to communicate information or data. The LED light system may also include a receptor coupled to the controller, where the receptor is constructed and arranged for receipt of pulsed LED light signals for conversion to digital information, and for transfer of the digital information to the controller for analysis and interpretation. The controller may then issue a light signal or other communication signal to an individual to communicate the content of received information transmitted via a pulsed LED light carrier.

In one embodiment of the invention, a Universal Serial Bus (USB) dongle or key or similar device may be plugged into a laptop computer or other USB-configured electronic device. The dongle, key or similar device, allows hardware like laptop computers, printers, or other electronic devices that were not originally designed with a server optical transceiver (XCVR) to be easily retrofitted to permit optical communications through transmission and reception of pulsed light signals, as generated by the LED's.

The USB dongle or key may be small, and may plug into diverse client devices for the purpose of providing data access and communication without mechanically interfering with the placement or use of the client device. The USB dongle or key sends and receives data signals which may be carried upon an optical transmission. The data signals may originate from and/or are received by a host device through one or more photodetectors.

The USB dongle or key may include a conversion device, or software performing a conversion function, for placement of a received or generated data signal into a desired format. In addition, the USB dongle or key may include appropriate buffering, isolation, modulation or amplification circuitry which will provide appropriate voltage and power through drive signals to adequately drive the LED(s) for production of a data-bearing visible light transmission. Exemplary of common transmit circuitry are operational amplifiers (op-amps) and transistor amplifiers.

The USB dongle or key device will preferably include reception circuitry for receiving data from a data-bearing visible light wave input signal. The data-bearing visible light wave may be detected by one or more light sensors and converted to a data-bearing electrical signal for processing within a USB-user configured device.

The USB dongle or key is preferably in communication with a host lamp fixture system which is in communication with a host processor. The host lamp fixture replaces conventional stationary (mounted in a particular place) lighting fixtures to provide optical communication between the host and the user device through the USB dongle or key. The host lamp fixture is preferably constructed and arranged to communicate data through pulsed light transmissions.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

DETAILED DESCRIPTION OF THE PREFERRED EMBODIMENTS

Figure 1:
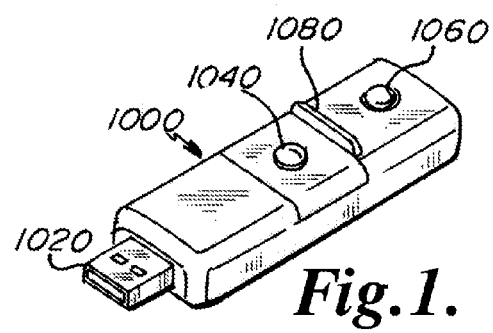
FIG. 1 is isometric view of an embodiment for an LED USB Dongle device.
Figure 2:
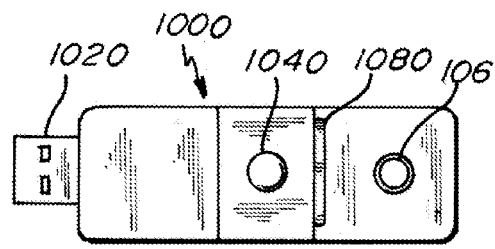
FIG. 2 is a top view of an embodiment of an LED USB Dongle device.
Figure 3:
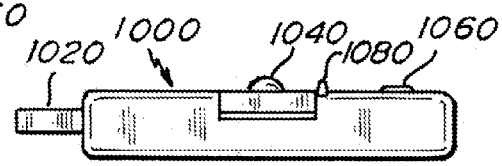
FIG. 3 is a side view of an embodiment of an LED USB Dongle device.
Figure 4:
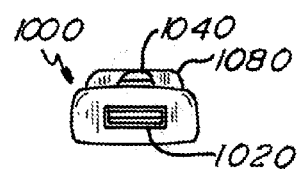
FIG. 4 is an end view of an embodiment of an LED USB Dongle device.

While this invention may be embodied in many different forms, there are described in detail herein specific preferred embodiments of the invention. This description is an exemplification of the principles of the invention and is not intended to limit the invention to the particular embodiments illustrated. For the purposes of this disclosure, like reference numerals in the figures shall refer to like features unless otherwise indicated.

In one of the embodiments disclosed herein, the controller may regulate and/or modulate the duty cycle for the LED light sources, thereby varying the intensity of the observed light. The controller may be utilized to simultaneously provide modulated or variable light intensity to different and/or independent sections, areas, and/or sectors of a light source or an LED server optical transceiver light fixture.

In one embodiment a server personal computer or other computing or electronic device may be connected via a USB cable to a server optical transceiver (XCVR), and a client personal computer or other computing or electronic device may be connected via a USB cable or port to a client optical transceiver. The server personal computer or other computing or electronic device may be in communication with a network via a CAT-5 cable, for example. The server optical XCVR and the client optical XCVR are substantially similar in at least one embodiment. An exemplary optical XCVR (or, simply, "XCVR") circuit includes one or more light emitting diodes (LEDs) for transmission of light and one or more photodetectors for receiving transmitted light. The term "photodetector" includes "photodiodes" and all other devices capable of converting light into current or voltage. The terms photodetector and photodiode are used interchangeably hereafter. The use of the term photodiode is not intended to restrict embodiments of the invention from using alternative photodetectors that are not specifically mentioned herein.

In at least one embodiment, the XCVR circuit may include an RS232 to USB conversion module. The transmit pin on the USB conversion module drives the driver electronics for the LEDs. In some embodiments, the XCVR circuit includes high intensity LEDs. In some embodiments it may be desirable to use high intensity LEDs to enhance lighting, to improve data transmission, or both. In at least one embodiment, a 12 volt DC, 3 amp power supply is sufficient for powering an array of high intensity LEDs.

In some embodiments, the XCVR circuit further includes an amplifier for amplifying the optical signal received by the photodiode. The output of the amplifier may be fed into level shifting circuitry to raise the signal to TTL levels, for example. The signal is then fed into the receive pin of the RS232 to USB module.

In some embodiments, a 9V battery can be used to power the amplifier circuitry. Significant noise is generated by switching high brightness LEDs on and off at 200 mA and 500 kbps, for example. Powering the amplifier with a battery can reduce these noise problems by reducing or removing transients.

It should be noted that in some embodiments, the LED can both emit and receive light. In such an embodiment, the LED can act both as a transmitter or receiver. More information on such bi-directional LEDs can be found in U.S. Pat. No. 7,072,587, the entire contents of which are expressly incorporated herein by reference.

The XCVR circuit may be incorporated into a Universal Serial Bus (USB) dongle or key device, such as shown in FIGS. 1-9, or similar device that is plugged into a laptop computer or other USB-configured electronic device. The dongle or key, or similar device, allows hardware like printers, etc. that were not originally designed with an optical XCVR to be easily retrofitted to permit optical communications. As seen in FIGS. 1-9, USB dongle or key 1000, includes a USB plug 1020 which is in the preferred embodiment most desirably compatible with standard USB connectors found on many electronic devices. USB connectors are found on nearly all recently manufactured printers, PCs, flash drives, portable media players such as MP-3 and video players, and a plethora of other electronic devices. While USB plug 1020 is preferred, owing to the wide availability of USB-enabled client devices, it is contemplated herein that the physical and electrical interface may comprise other standards or alternative constructions. As but one example, an IEEE-1394 (Firewire) interface may be provided alternatively or in addition to USB plug 1020. USB dongle or key 1000 is in the most preferred embodiment physically small, such that it may plug into diverse client devices for the purpose of providing data access and communication without mechanically interfering with the placement or use of the client device.

Instead of relying on radio frequencies, USB dongle or key 1000 communicates through a visible light embedded communications channel or system (VLEC). Data signals carried upon an optical embedded light transmission are received from a host through photodetector 1040. Data signals are transmitted to the host by LED 1060. Most preferably, photodetector 1040 and LED 1060 are isolated by a visible barrier, which may be a simple protrusion 1080. Recesses and other optical barriers are further contemplated herein to serve as isolation from emitter-receiver feedback.

Figure 5:
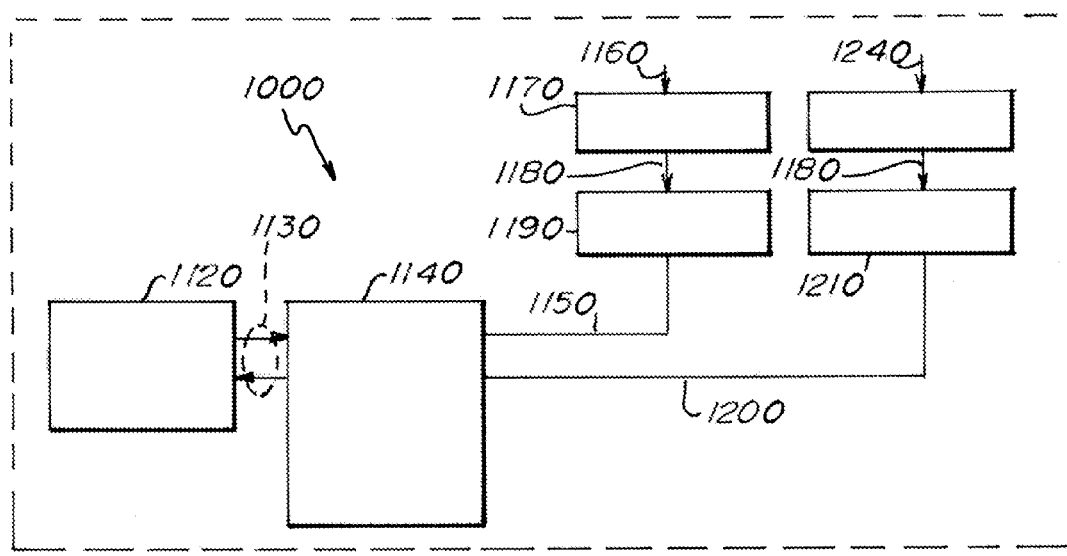
FIG. 5 is a block diagram of an alternative embodiment of the Communication System for an LED USB Dongle device.
Figure 6:
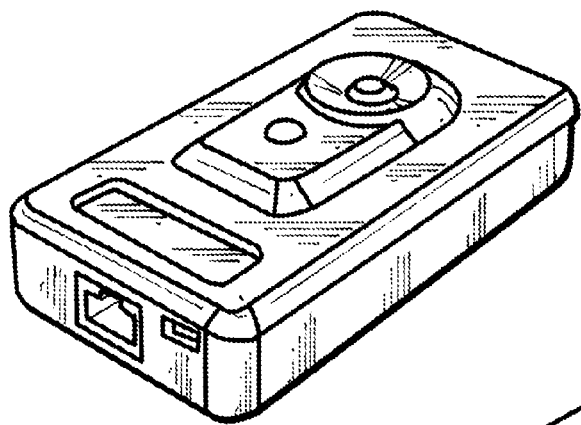
FIG. 6 is an alternative isometric view of one embodiment of an LED USB Dongle or device.
Figure 9:
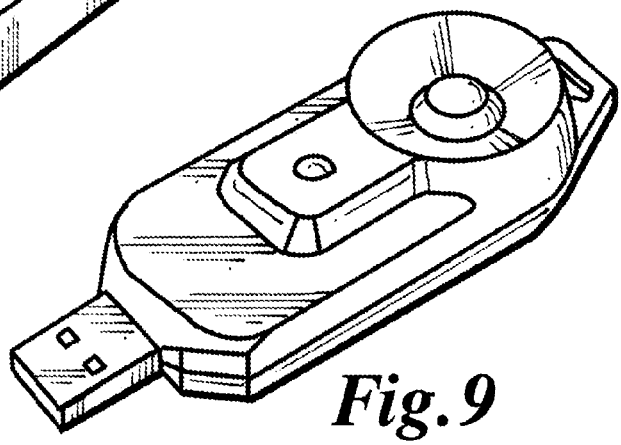
FIG. 9 is an alternative isometric view of one embodiment of an LED USB Dongle or device.
Figure 7:
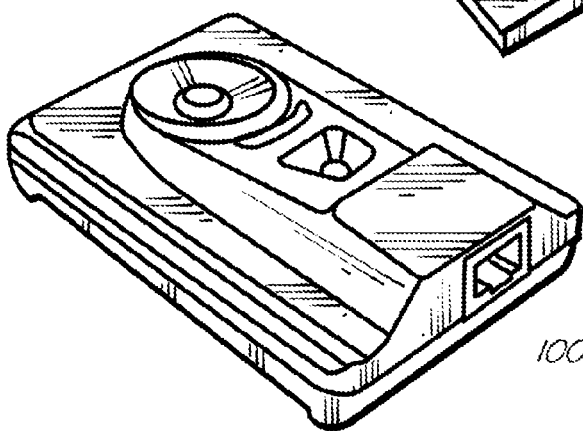
FIG. 7 is an alternative isometric view of one embodiment of an LED USB Dongle or device.

USB dongle or key 1000 is enabled to electrically connect to any client's electronic device that accepts USB plug 1020, or other connector substituted or provided in addition thereto. FIG. 5 illustrates through a schematic block diagram an exemplary electrical design of a USB dongle or key. To be recognized by the client device, the USB dongle or key will have to obey the electrical and communications specifications for the particular connection type. Consequently, in the preferred embodiment, the USB dongle or key will comply with both physical and electrical USB specifications through a suitable connection apparatus 1120, allowing connection to a USB host.

The USB-compliant signal 1130 is not, in the preferred embodiment, the preferred signal format for optical embedded light transmission or reception. Consequently, transmission of USB-compliant signals 1130 will require conversion through conversion apparatus 1140 to suitable optical light embedded transmission format required at transmit signal 1200. For exemplary purposes, if the USB specification uses a differential signaling method using two wires for data, it may be desirable to convert USB-compliant signal 1130 to a different signaling standard, such as a single-ended signaling scheme like the well-known RS-232 standard, which uses a single line for data. Conversion apparatus 1140 will, in accord with the preferred embodiment, be configured to provide the selected electrical conversion. Transmit circuitry 1210 may, in the preferred embodiment, simply be appropriate buffering, isolation, modulation or amplification circuitry which will provide appropriate voltage and power through drive signal 1220 to adequately drive LED 1230 into producing a data-bearing visible light embedded transmission 1240. Exemplary of common transmit circuitry are operational amplifiers (op-amps) and transistor amplifiers, though those skilled in the art of signal conditioning will recognize a plethora of optional circuits and components which might optionally be used in conjunction with the present invention. In one conceived embodiment, the data-bearing visible light transmission 1240 may further be modulated, using FM, AM, PWM, PPM, OFDM, QAM or other known modulation techniques.

Similar to the transmission circuitry, USB dongle or key 1000 also incorporates reception circuitry for receiving data from a data-bearing visible light wave input signal 1160. Data-bearing visible light wave signal 1160 will be detected by light sensor 1170 and converted to a data-bearing electrical signal 1180. Receive circuitry 1190 will appropriately condition, and may further convert data-bearing electrical signal 1180. As but one example of such conversion, receive circuitry 1190 may additionally demodulate data-bearing electrical signal 1180, if the data stream has been modulated by an optical host, and suitable buffering, amplification and other conditioning may be provided to yield a received data signal 1150. Conversion apparatus 1140 will convert received signal 1150 to a USB-compliant signal 1130.

The preferred embodiment USB dongle or key 1000 uses visible light as the communications channel between client and host, which offers advantage in security, reliability, system testing and configuration, bandwidth, infrastructure, and in other ways. Security is greatly increased because light does not go through walls, in contrast to radio communications, and steps can be taken to obstruct visible transmissions with a much greater certainty than with high frequency radio waves. Furthermore, the visible light may additionally be limited or directed by known optical components such as lenses and reflectors to selectively form beams, as opposed to omni-directional transmissions.

The visible optical link does not interfere with existing communication systems like those that are common today. Consequently, the preferred embodiment may be used in a variety of applications where prior art systems were simply unable to function due to EMI/RFI considerations.

Set-up, testing, troubleshooting and the like are also vastly simplified. When the visible light embedded communication system is working, the user can actually see the illumination. If an object interferes with light transmission, the user will again immediately recognize the same. Thus, the ease and convenience of this visible light embedded communication system adds up to greater mobility and less cost. In addition, relatively high energy outputs may be provided where desired using the preferred visible light embedded communications channel. In contrast, many invisible transmission techniques such as Ultraviolet (UV) or Infra-Red (IR) systems have much potential for harm to the eyes of an individual.

A host lamp fixture system replaces stationary (mounted in a particular place) lighting fixtures in order to communicate data. Inside of LED lights there may be one or many dies; these may pulsate on slightly different frequencies from a single light to communicate. Each may be looking for changes by way of Multiple Channel Access or other suitable technique.

When a client (such as a laptop) asks for channels, the host tells where the channels can be located. LED lights in a ceiling, for example, will communicate with any capable transceiver. One suitable method uses BPL (Broadband over Power Lines) for network connection, taking data and embedding it into a carrier frequency or group like radio, but instead using power lines or wave guides for transmission throughout an existing set of power lines within a building. Thus, a building needs to be wired only for lights, saving a huge infrastructure of other wires and fixtures, and saving a great deal of money.

In at least one embodiment, the optical XCVRs, or circuitry attached thereto, include modulation circuitry for modulating a carrier signal with the optical signal. Modulation may be used to eliminate bias conditions caused by sunlight or other interfering light sources. Digital modulation may be accomplished by using phase-shift keying, amplitude-shift keying, frequency-shift keying, quadrature modulation, or any other digital modulation technique known by those of ordinary skill. Similarly, such XCVRs can include demodulation circuitry that extracts the data from the received embedded light signal. Some modulation and demodulation techniques for modulating light signals are described in U.S. Pat. Nos. 4,732,310, 5,245,681, and 6,137,613, the entire contents of each being expressly incorporated herein by reference.

It may be desirable in some embodiments to further include filters or filter circuitry to prevent unwanted light from being amplified. For example, the optical baseband signal can be modulated at 100 kHz and then transmitted. The XCVR that receives the 100 kHz modulated signal can include a filter stage centered at 100 kHz. The filtered 100 kHz signal can then be input into the amplifier circuitry, thereby preventing amplification of unwanted signals. In some embodiments, it may be desirable to amplify the transmitted signal first, and then filter out the baseband signal.

Additional information regarding data communication can be found in International Publication Number WO 99/49435, the entire contents of which are expressly incorporated herein by reference.

In one embodiment of the present invention a user device equipped with a USB dongle or key may be in communication with a system incorporating the use of broadband over power line (BOPL) communications system. Techniques for transmitting data signals over power lines can be found in U.S. Pat. No. 7,349,325, the entire disclosure of which is expressly incorporated herein by reference.

In some embodiments, an LED optical XCVR light fixture provides lighting for one or more rooms on a customer premises. In operative communication with the LED optical XCVR is a power line bridge that demodulates the signal from the electrical power that supplies power to AC/DC converter that supplies power to the LED array of the XCVR. The power line bridge sends the demodulated signal to the LED optical XCVR for transmission. The USB dongle or key in turn is in optical communication with the XCVR enabling communication from a host through the Broadband over power line network, then through the power bridge, and finally optically from the XCVR to a user device.

It may be desirable, however, to modulate the light signal prior to transmission to reduce the effects of external lighting. Such an embodiment may be desirable because each room at a customer premise can be either be designed for or retrofitted with LED optical XCVRs in the ceiling, for example, for lighting. As such, the main light source in the room doubles as an optical link for electronic equipment. Because the LED optical XCVRs are located in the ceiling, there are few items that can block the light signal.

Injecting the signal onto the electrical wiring and providing an optical link through LED lighting is advantageous over wireless DSL modems. Often times, metal shelving or other structures on the premises interfere with or even block RF signals, thereby requiring multiple access points. However, providing an optical link through LED lighting in each room, for example, inherently provides multiple access points.

In some embodiments, a variety of physical and electrical configurations are contemplated herein for LED XCVR light fixture. The LED XCVR light fixture may replace a standard fluorescent tube light fixture. This can be accomplished by replacing the entire fixture such that ballasts and other devices specific to fluorescent lighting are replaced. In many cases, this will be the preferred approach. The fixture may then be wired for any suitable or desired voltage, and where a voltage or current different from standard line voltage is used, transformers or power converters or power supplies may be provided. When a building is either initially being constructed, or so thoroughly remodeled to provide adequate replacement of wires, the voltage may be generated in transformers that may even be provided outside of the occupied space, such as on the roof, in a utility room, basement or attic. In addition to other benefits, placement in these locations will further reduce requirements for air conditioning.

As efficiencies of light generation by LEDs surpass fluorescent tubes, such entire replacement is more economical. However, total replacement of such fixtures is not the only means contemplated herein. Any lesser degree of replacement is also considered in alternative embodiments. For exemplary purposes, the physical reflectors commonly associated with fluorescent fixtures may be preserved, and the fixture simply rewired to bypass any ballasts or starter circuitry that might be present. In this case, line voltage, such as 120VAC at 60 Hertz in the United States, may pass through the electrical connector pins.

Where other types of fixtures already exist, such as standard incandescent Edison screw bases, LED bulbs may similarly accommodate the fixture. For incandescent replacement, no rewiring or removal of ballasts is required, since line voltage is applied directly to incandescent fixtures. Consequently, appropriate conversion may in one conceived alternative embodiment simply involve the replacement of a bulb with no fixture or wiring alterations.

In accord with one alternative method of the invention, LEDs are used to transmit through optical communication channel several kinds of data, including identity, location, audio and video information. The use of an optical communications link provides large available bandwidth, which in turn permits multiple feeds of personal communication between LED light sources and devices utilizing a USB dongle or key communication interface which may be similar to or in excess of that of cell phones. The optical data is transferred at rates far in excess of those detectable by the human eye, and so a person is not able to detect any visible changes as the data is being transferred. Additionally, because optical illumination is constrained by opaque objects such as walls, the location of a user device having a USB dongle or key can be discerned to a particular room, hallway or other similar space.

Within the disclosure provided herein, the term "processor" refers to a processor, controller, microprocessor, microcontroller, mainframe computer or server, or any other device that can execute instructions, perform arithmetic and logic functions, access and write to memory, interface with peripheral devices, etc. As described herein each, optical XCVR may also include non-volatile memory (FLASHRAM, EEPROM, and EPROM, for example) that may store firmware for the optical XCVR, as well as text information, audio signals, video signals, contact information for other users, etc., as is common with current cell phones.

In some embodiments, an optical signal amplifier is in communication with the photodiodes to increase the signal strength of the received light signals. In at least one embodiment, the LEDs are in operative communication with an LED power driver, ensuring a constant current source for the LEDs.

Another embodiment of the present invention incorporates Global Positioning and/or Routing System (GPSrS) information into the data packet to be sent. The Global Positioning and/or Routing System is described in U.S. Pat. No. 4,785,463, the entire contents of which are expressly incorporated herein by reference. Global Positioning System (GPS) positioning uses one or more coordinate systems, such as World Geodetic System 1984 (WGS84), to provide a reference frame, allowing every point on earth to be coded with a unique GPS location.

A data packet may include GPS location header bits that include the packet's destination address in GPS coordinates. The data packet may further include GPS location trailer bits that include the packet's origin address in GPS coordinates. The data packet may further include the address in GPS coordinates of the server optical transceiver (XCVR) that most recently transmitted the packet (the last known transmission address, or LTA), as will be described in more detail below. The data packet further includes the data to be transmitted, and may include any other bits of information determined to be necessary for successful transmission of data, such as error detection bits, as understood by a person of ordinary skill in the art.

Routing data packets from one location to another location may be accomplished using GPS location information tags data packets having either a geographic location or a cyber location. Such an embodiment eliminates the need for any later geographic location translation because a data packet starts with geographic source and destination information. This simplifies locating the destination of the data packet.

In some embodiments, each data packet is assigned a GPS origin/destination address as it passes through the network infrastructure. The data packet is always searching for the next closest GPS address location. Each stationary (or static) optical XCVR, and some dynamic optical XCVRs, within a network may be designated with a GPS location number. As a data packet passes through the network, it is routed by the optical XCVRs, with their internal processors, to the next physically closer optical XCVR within the network. If another optical XCVR is within receiving range, or is connected with another form of communication medium, that optical XCVR receives the data packet. The optical XCVR's internal processor compares its internal GPS location address (ILA) to the data packet's GPS destination address and the optical XCVR's last known transmission address (LTA) stored within the data packet. If the ILA code is closer to the data packet destination address then the LTA code is stored within the data packet, the optical XCVR's processor inserts its ILA code into the data packet as the new LTA code and then repeats transmission of the entire data packet with the updated LTA code.

The network continues this process until the data packet reaches the destination optical XCVR, at which point the data packet is transmitted to a client device. If a piece of the infrastructure is missing, the packet will be rerouted to the next nearest optical XCVR and continue until it finds the shortest pathway through the network to the destination address.

This means that each user on the network may declare one or more static positions and also have a dynamic position. A static address may be a home, an office, etc. When a user leaves their static address location to move through the network infrastructure, the user then becomes dynamic. The network may track the user as the user passes optical XCVRs, similar to that of cell phones in relation to cell phone towers, and provide a dynamic address location. If a data packet begins with a destination address that is the user's static address, the network may update the packet with the user's new dynamic address and reroute the packet accordingly, in a scheme similar to that of cellular phones.

In some embodiments, the quantity of a communication or data transmission portion of a visible light embedded communication may be rendered as a Data Lumen hour (DLh). The visible light embedded communication may be utilized by establishing a Visible Light Link (VLL or VL) using an external electronic adjunct apparatus or an incorporated electronic capability within an electronic data computing device, which in turn is enabled and operated within specified proximity to a DLh lamp fixture. In some embodiments, the electronic apparatus and capability is known and offered as a Dongle or Key or the device is "Keyed". As the KEY or Keyed device accesses DLh enabled lamps, the use of the KEY is billed as a service to its user in units of Data-Lumen-minutes (DLm). In some embodiments, each used or consumed minute or fraction thereof is assigned a monetary value.

In some embodiments, the KEY is a small transceiver that provides communication between a computing device and an LED XCVR light or light fixture. The computing device may access the Internet or other networks through the pulsed light, communication, and information/data transmission system network. In some embodiments, Keys interface with computers through USB ports and/or cables.

Keys currently allow a computer to access the pulsed light, communication and information/data transmission system network and the Internet through an LED XCVR light. In at least one embodiment, the pulsed light, communication, and information/data transmission system is integrated into cell phones and other communication devices.

In some embodiments, the pulsed light, communication and information/data transmission system provides wireless communication which delivers higher data transfer speeds and greater security than Wi-Fi technologies. The pulsed light communication and information/data transmission system may also safely be used in places where Wi-Fi transmissions are potentially harmful or limited, such as in hospitals or on airplanes.

In some embodiments, the LED's of the pulsed light communication and information/data transmission system may be connected to a computer network with Cat5 or fiber optic cables, or through existing electrical wiring (similar to Broadband over Power Line, BPL). By utilizing existing electrical wiring, as much of the network wiring complications inherent in expanding communication infrastructure throughout a customer's facility may be avoided.

In some embodiments, the pulsed light communication and information data transmission system may enhance the capacity and security of wireless Internet, mobile broadband applications, Voice over Internet Protocol (VoIP), and many other data communication services. For example, the expansion of the pulsed light communication and information/data transmission system may allow data traffic on mobile networks to be offloaded onto fixed pulsed light communication and information/data transmission system networks, thereby relieving pressure from increasing mobile data applications.

In some embodiments, electrical power for pulsed light communication and information/data transmissions through a KEY may be provided through the USB port eliminating separate power connection to a wall outlet.

In some embodiments, the circuit boards for the KEY as identified in FIGS. 12-19 improve KEY performance and reduce thermal impact. In some embodiments, the circuit boards for the KEY as identified in FIGS. 12-19 provide data throughput of approximately 3 Mbps, with actual throughput after routing approximately at least 2.4 Mbps. Initially data was transferred to the computer for later transfer through the KEY using standard Ethernet cables.

In other embodiments, functions such as microphones and speakers may be regulated as well as cellular telephones if equipped with a pulsed light communication interface such as a dongle or key device. In some embodiments, a dongle or key device will also include supplemental devices such as cameras, microphones, and speakers and the like.

In some embodiments, the dongle or key device is the communication transceiver connected to the client side of the communication link in the LED pulsed light communication and information/data transmission system. The other end of the communication link is referred to here as the Host. The dongle or key device consists of three basic circuit components: the transmitter (TX), receiver (RX), main board (main). The three boards listed combine to form the electronic control component for the Client-Key for access to the LED pulsed light communication and information/data transmission. In some embodiments, the key plugs into and is powered by the USB port on a client computer or other electronic device. The client computer or other electronic device is configured to use the USB port as the communication port for the optical link.

The transmitter board consists of a power system, a signal interface for the main board, an LED, and the associated LED drive circuitry. The transmitter board accepts communication signals from the main board and drives the LED's as needed to provide the optical link with the required signaling.

The receiver board consists of a power system, a photodetector, a signal interface for the main board, a transimpedance amplifier (TIA), and discrimination circuitry. The receiver board receives the optical signal from the Host transmitter and converts it to a voltage signal usable by the main board.

The main board consists of a power system, an Field Programmable Gate Array (FPGA) system, signal interfaces for the receiver and transmitter boards, and a USB interface. The main board accepts the receiver signal that is routed to the onboard FPGA after signal conditioning. The FPGA decodes and reconfigures the serial received data to be sent across a standard network or MIL interface to the USB interface circuitry. In addition, the FPGA reconfigures the data from the USB interface to produce a serial data stream to be sent to the transmitter board for transmission across the optical link after signal conditioning. Currently the pre-production optical data link uses an on-off keying (OOK) signal structure with 8b/10b encoding for communication and luminous flux consistency.

In some embodiments, the Visual Light Modem for a dongle or key utilizes a Xilinx Spartan 3E Field-Programmable Gate Array (FPGA) at its core for processing Ethernet packet data into visible light communications. The FPGA is user configurable and easily programmed using a hardware description language (HDL). In some embodiments, a combination of Verilog and VHDL are used for programming. The FPGA configuration in some embodiments may be stored in flash memory and is written to the FPGA at every power cycle. Multiple hardware circuit interfaces connect to the I/0 of the FPGA to provide the VLM functionality. Details of this circuitry can be found in the electrical schematics provided herein in FIGS. 20 through 27.

Figure 11:
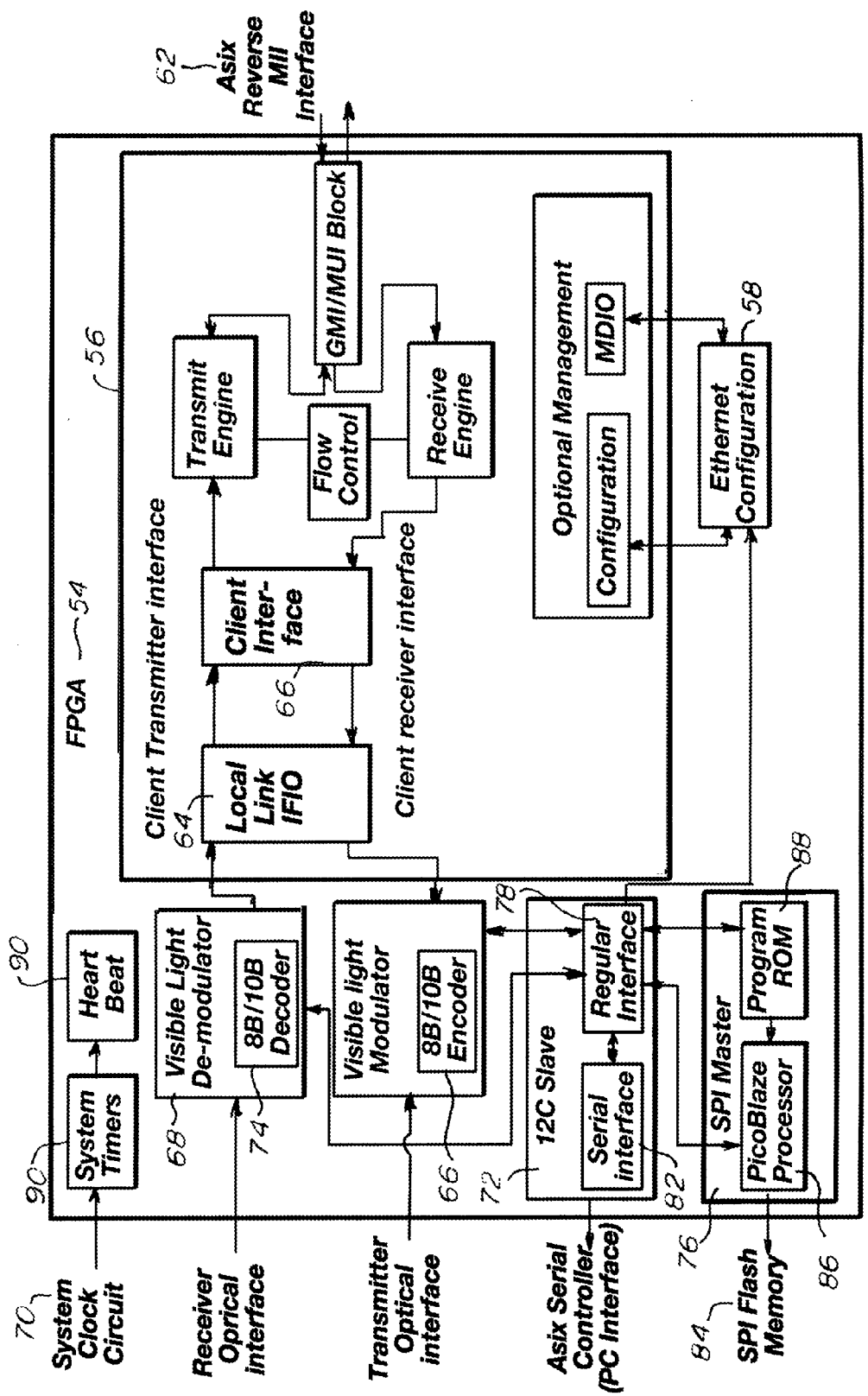
FIG. 11 is a system level block diagram of one alternative embodiment of the operation of an LED USB Dongle or Key device.
Figure 13:
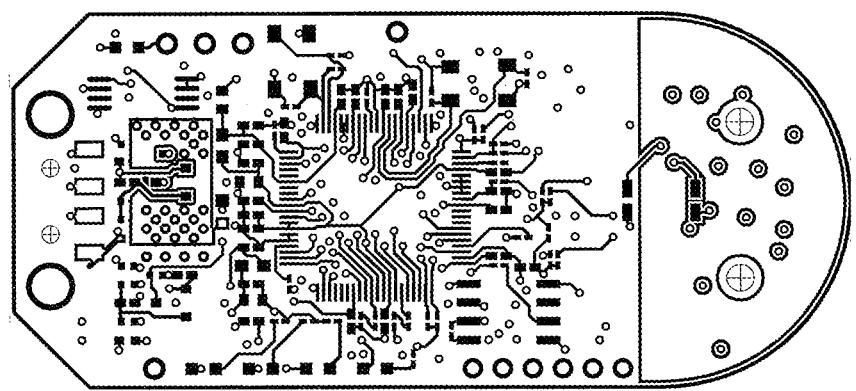
FIG. 13 is an alternative isometric view of one embodiment of a layout of one layer circuit board as used in an LED USB Dongle or Key device.
Figure 14:
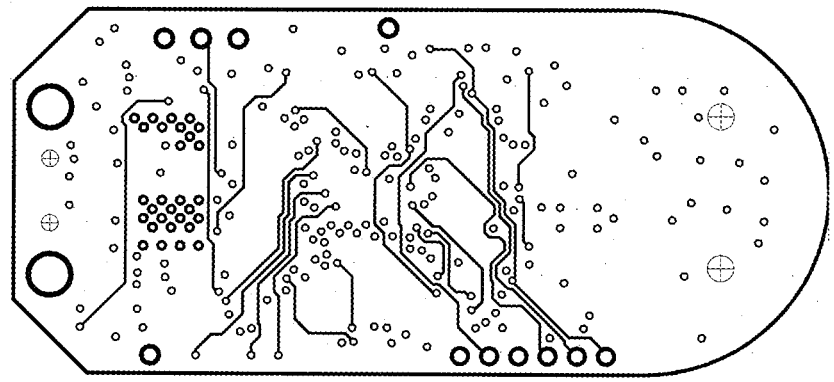
FIG. 14 is an alternative top view of one embodiment of a layout of one layer of a circuit board as used in an LED USB Dongle or Key device.
Figure 15:
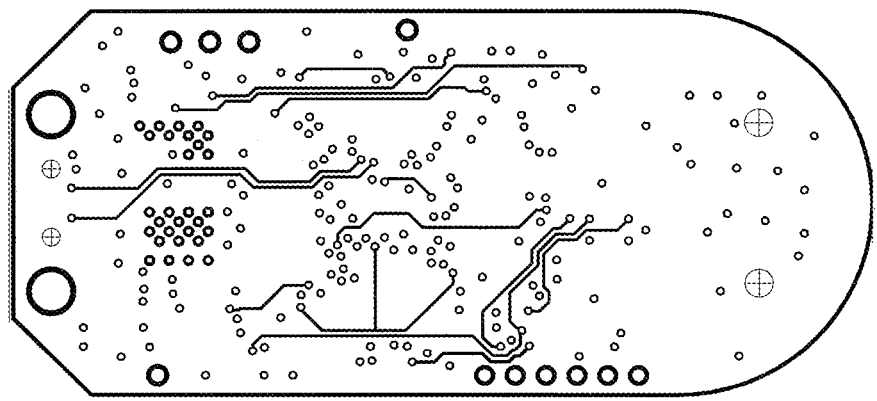
FIG. 15 is an alternative top view of one embodiment of a layout of one layer of a circuit board as used in an LED USB Dongle or Key device.
Figure 16:
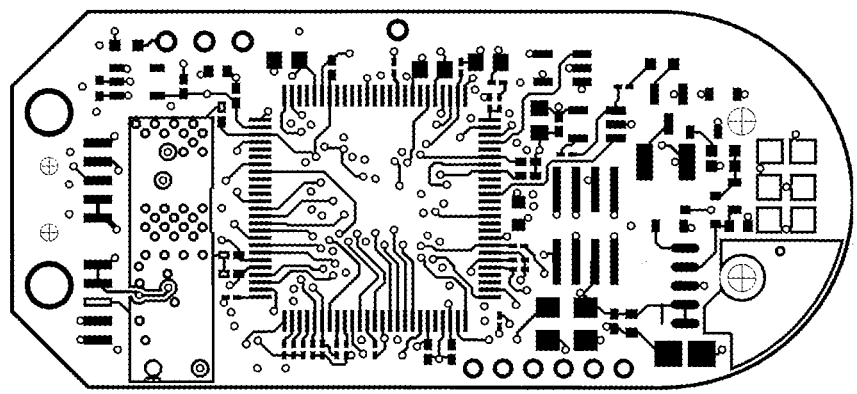
FIG. 16 is an alternative top view of one embodiment of a layout of one layer of a circuit board as used in an LED USB Dongle or Key device.
Figure 17:
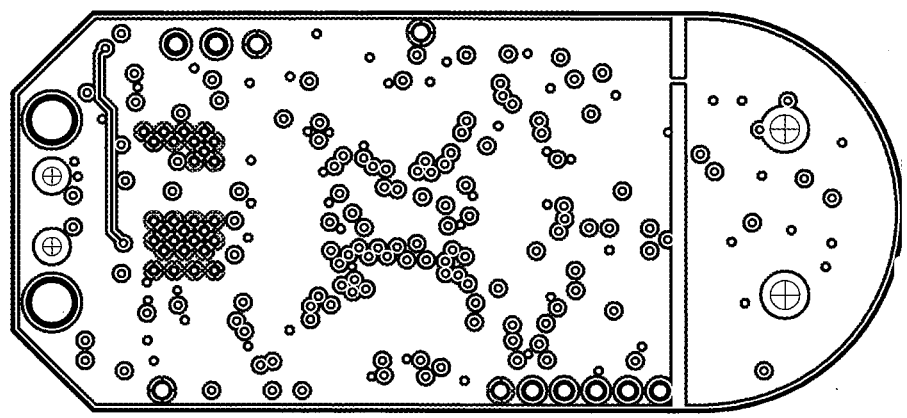
FIG. 17 is an alternative top view of one embodiment of a layout of one layer of a circuit board as used in an LED USB Dongle or Key device.
Figure 18:
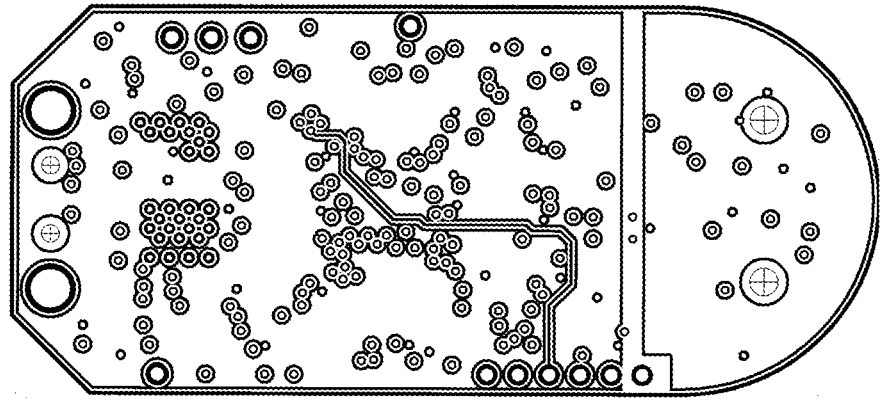
FIG. 18 is an alternative top view of one embodiment of a layout of one layer of a circuit board as used in an LED USB Dongle or Key device.
Figure 19:
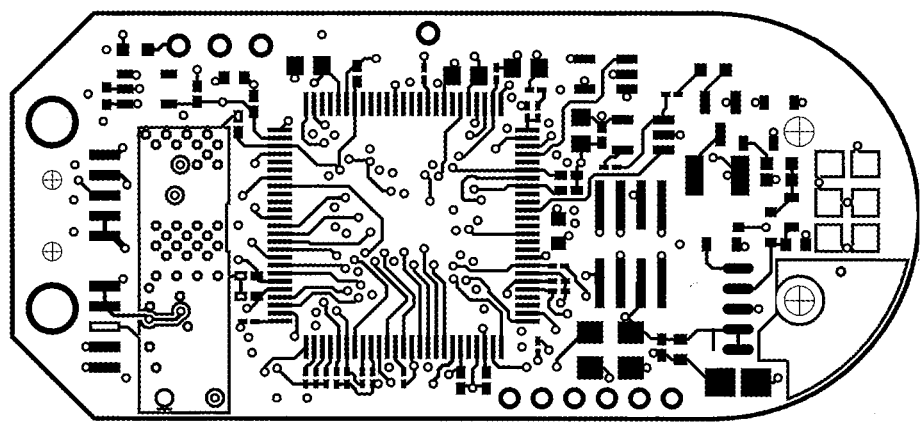
FIG. 19 is an alternative top view of one embodiment of a layout of one layer of a circuit board as used in an LED USB Dongle or Key device.
Figure 20A:
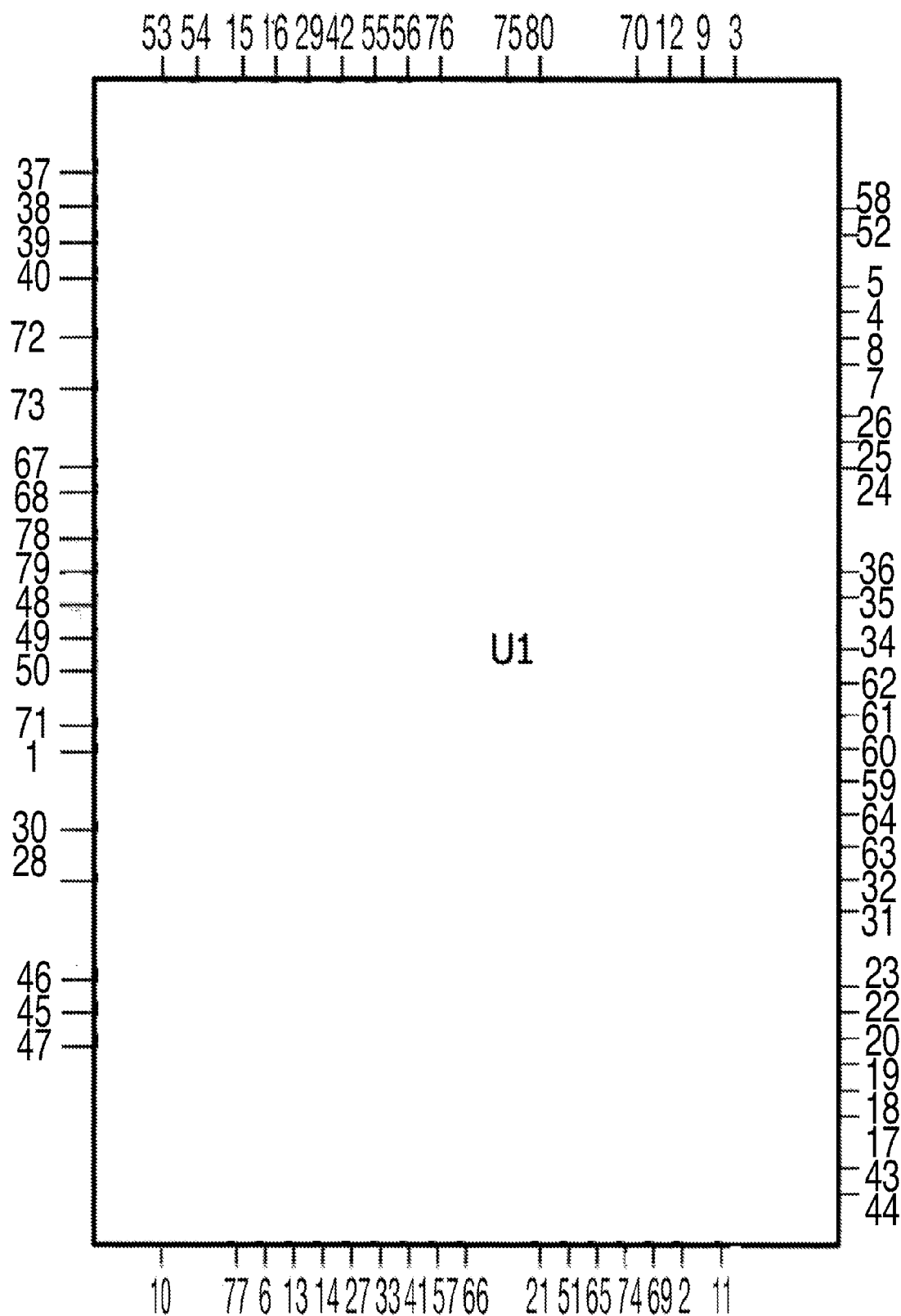
FIG. 20A is a partial electrical schematic of one alternative embodiment of an LED USB Dongle or Key device.
Figure 20B:
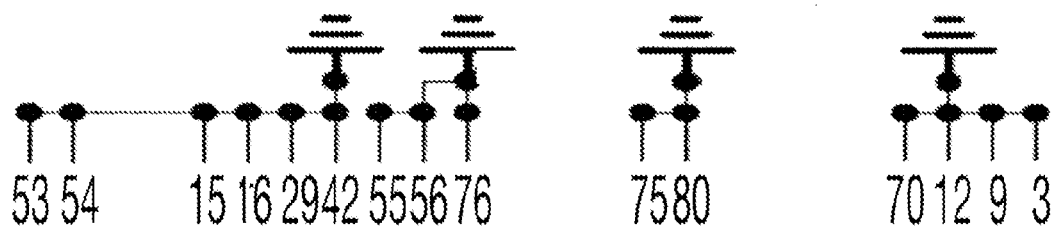
FIG. 20B is a partial electrical schematic of one alternative embodiment of an LED USB Dongle or Key device.
Figure 20C:
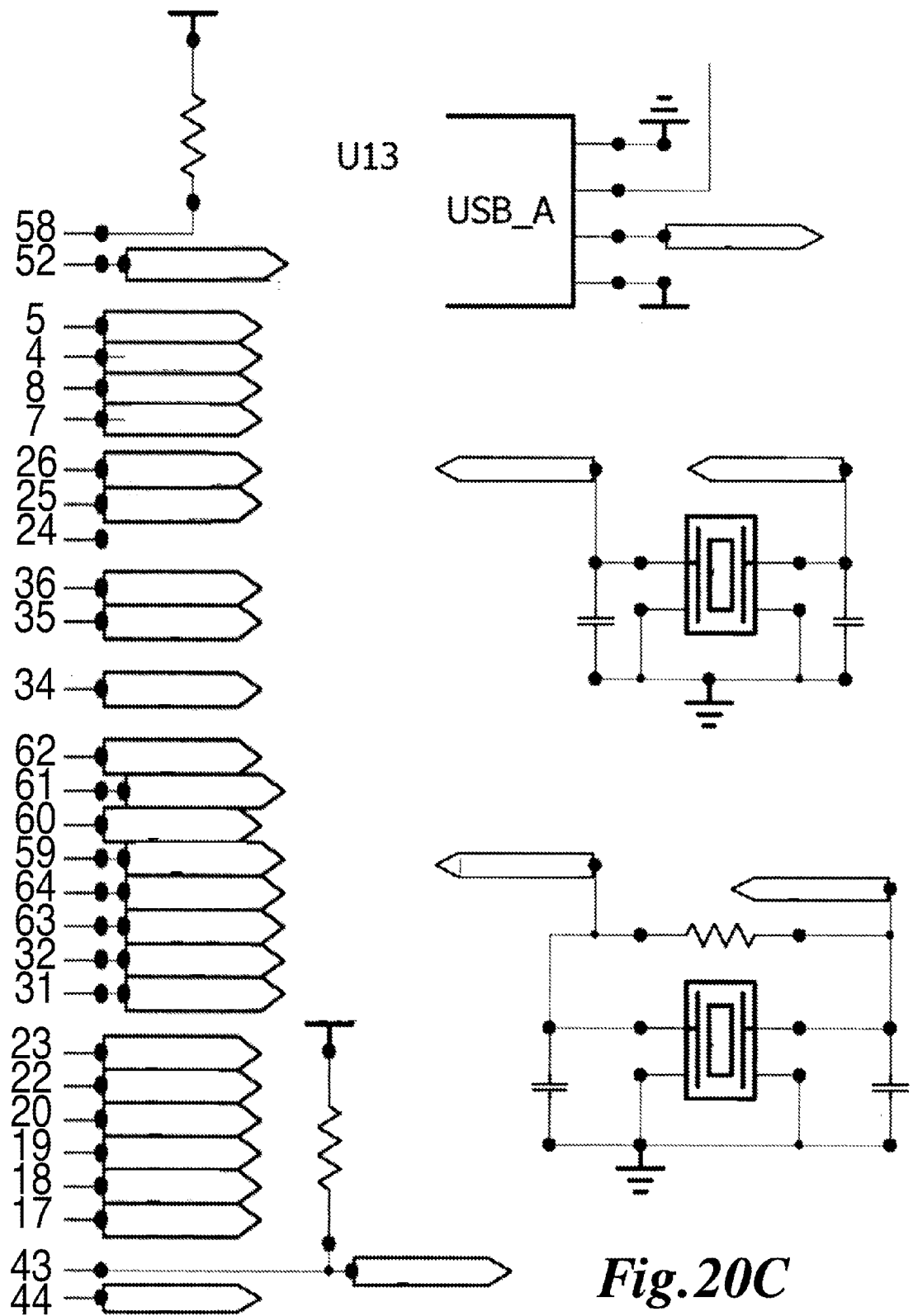
FIG. 20C is a partial electrical schematic of one alternative embodiment of an LED USB Dongle or Key device.
Figure 20D:
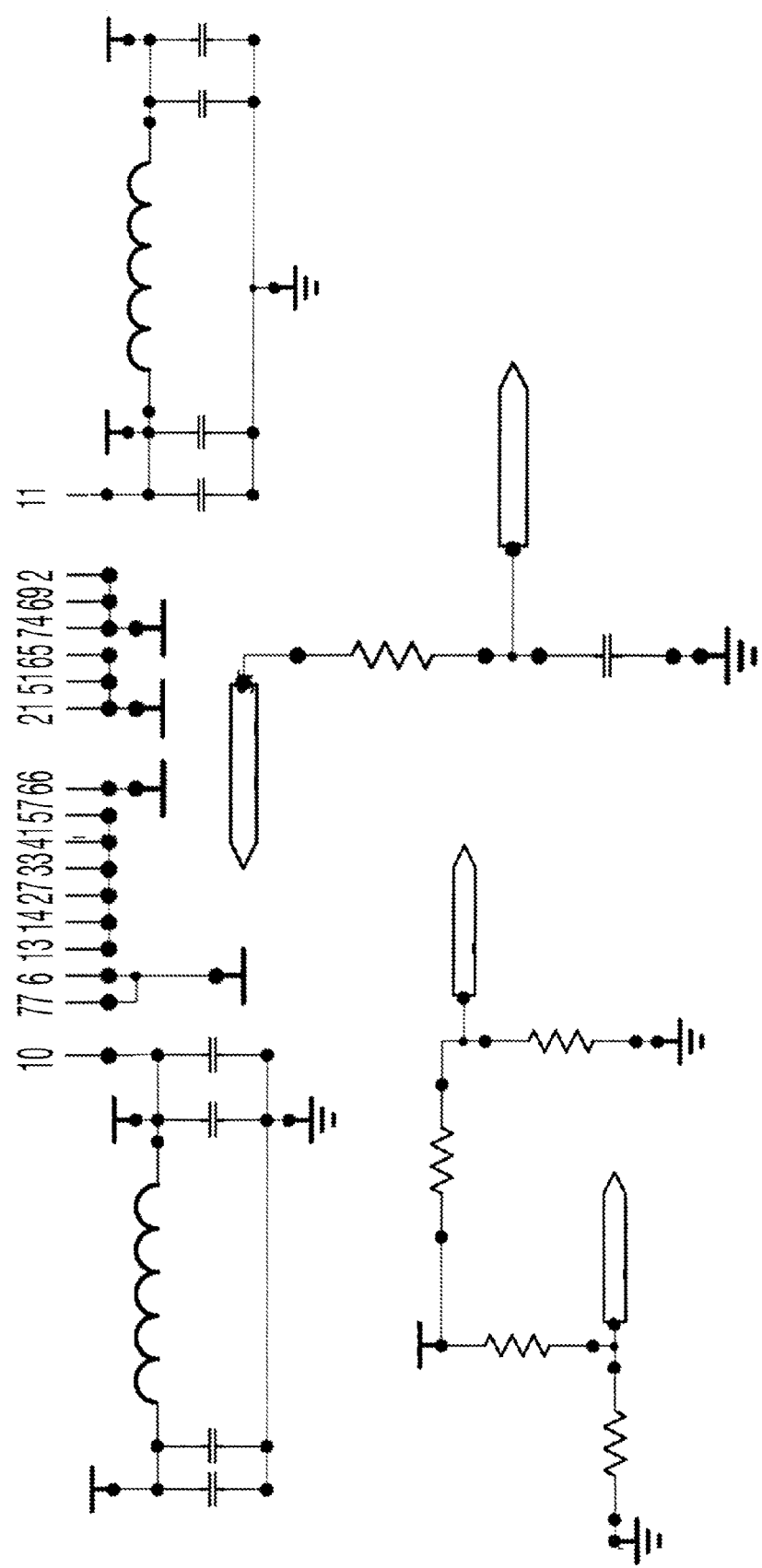
FIG. 20D is a partial electrical schematic of one alternative embodiment of an LED USB Dongle or Key device.
Figure 20E:
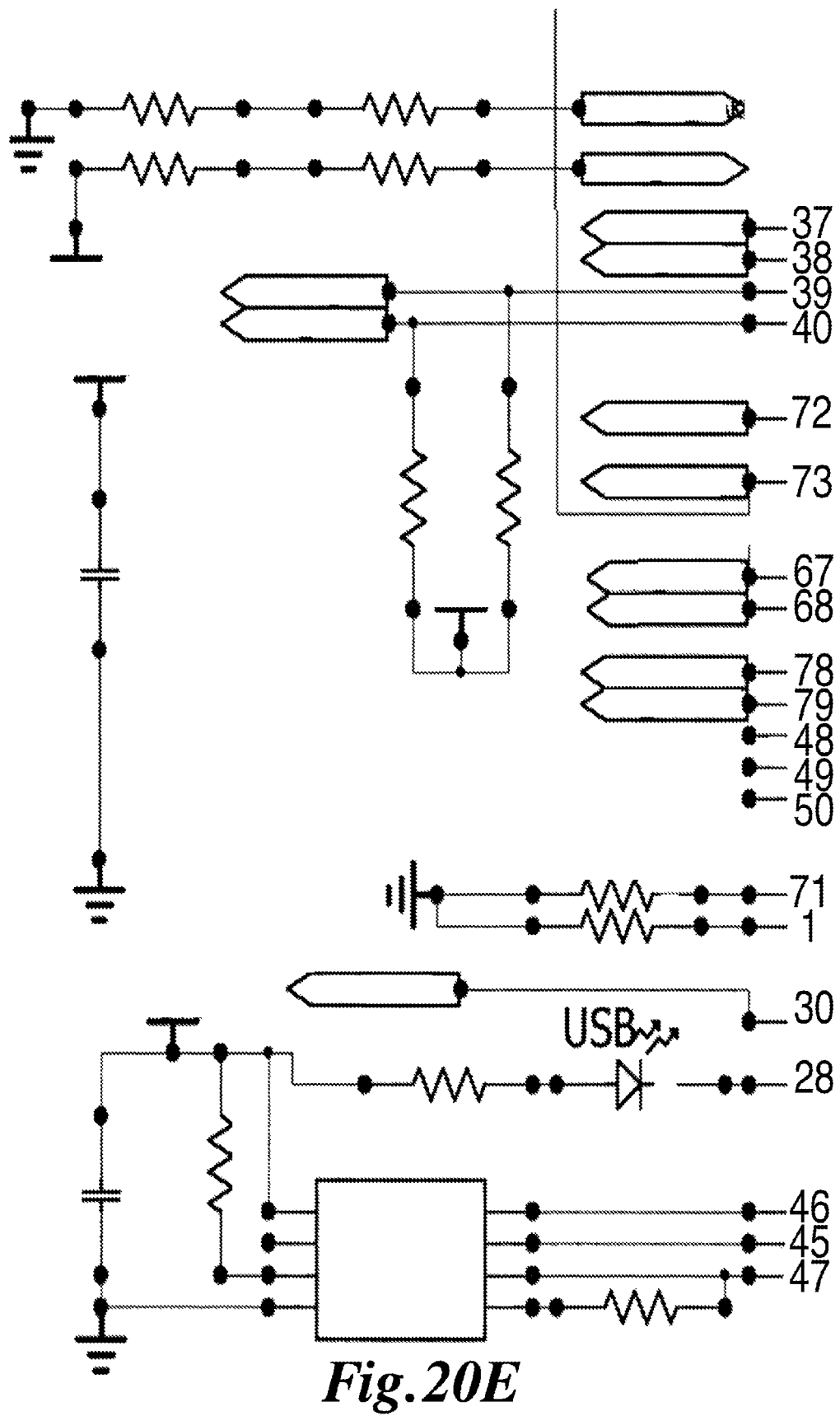
FIG. 20E is a partial electrical schematic of one alternative embodiment of an LED USB Dongle or Key device.
Figure 21:
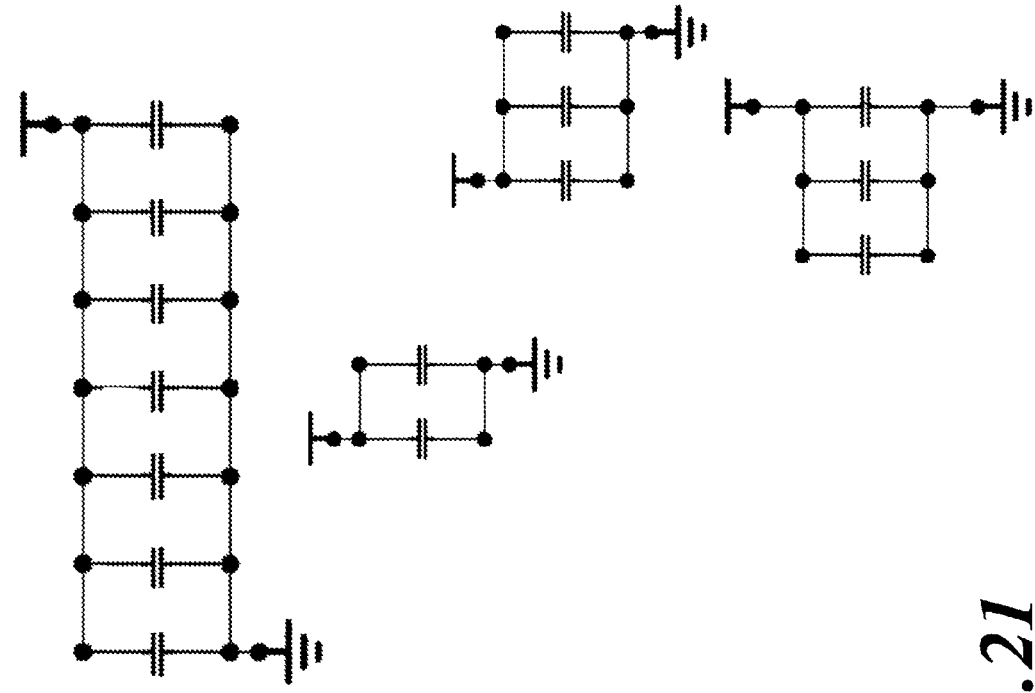
FIG. 21 is a partial electrical schematic of one alternative embodiment of an LED USB Dongle or Key device.
Figure 21:
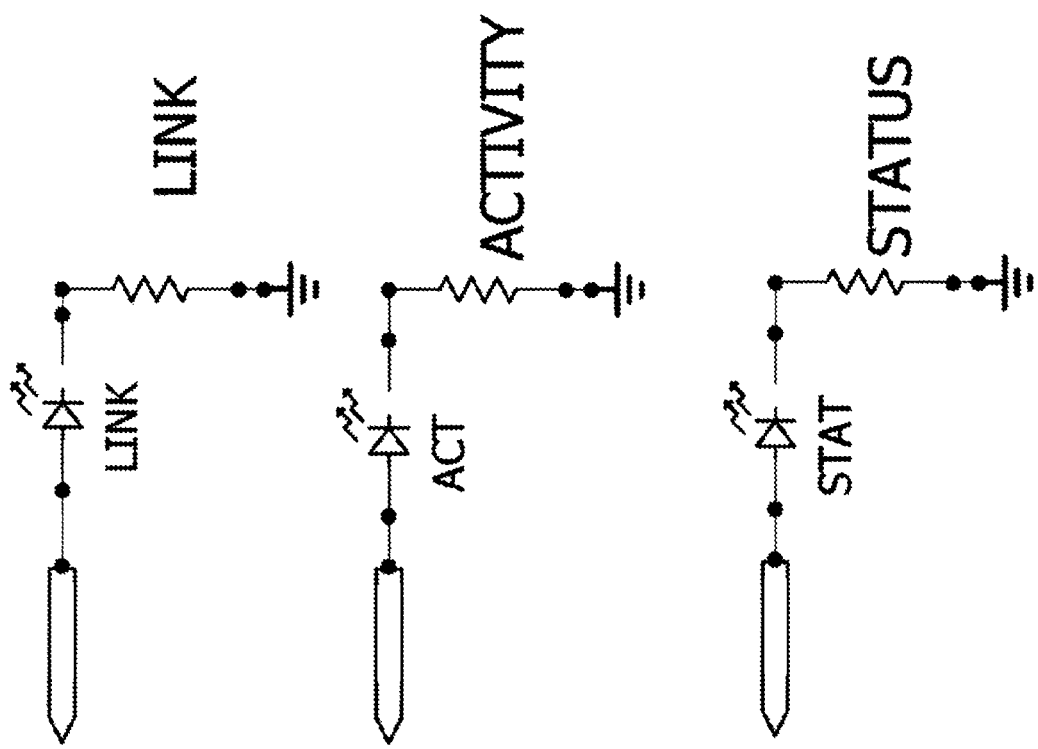
Figure 22:
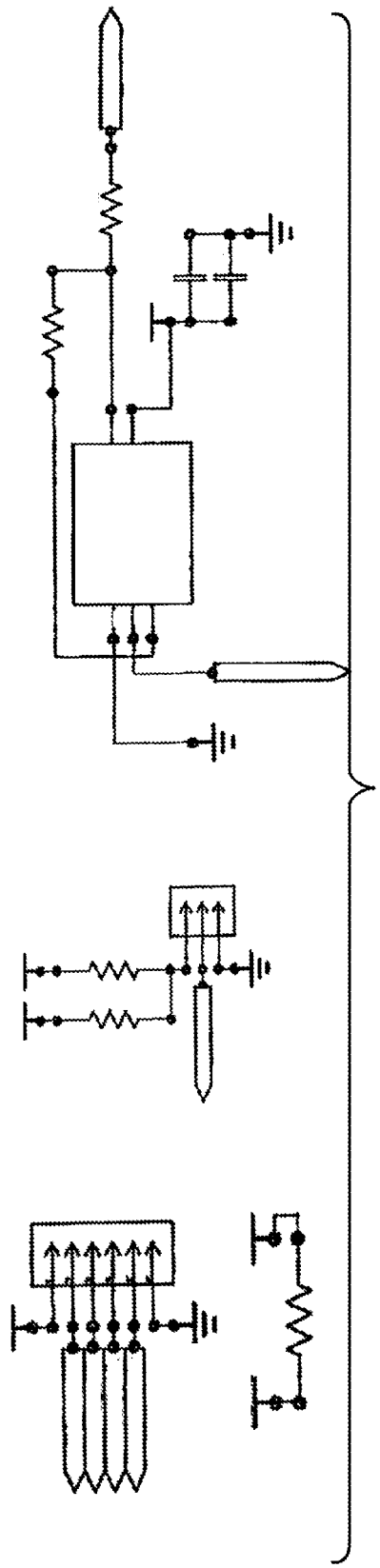
FIG. 22 is a partial electrical schematic of one alternative embodiment of an LED USB Dongle or Key device.
Figure 23:
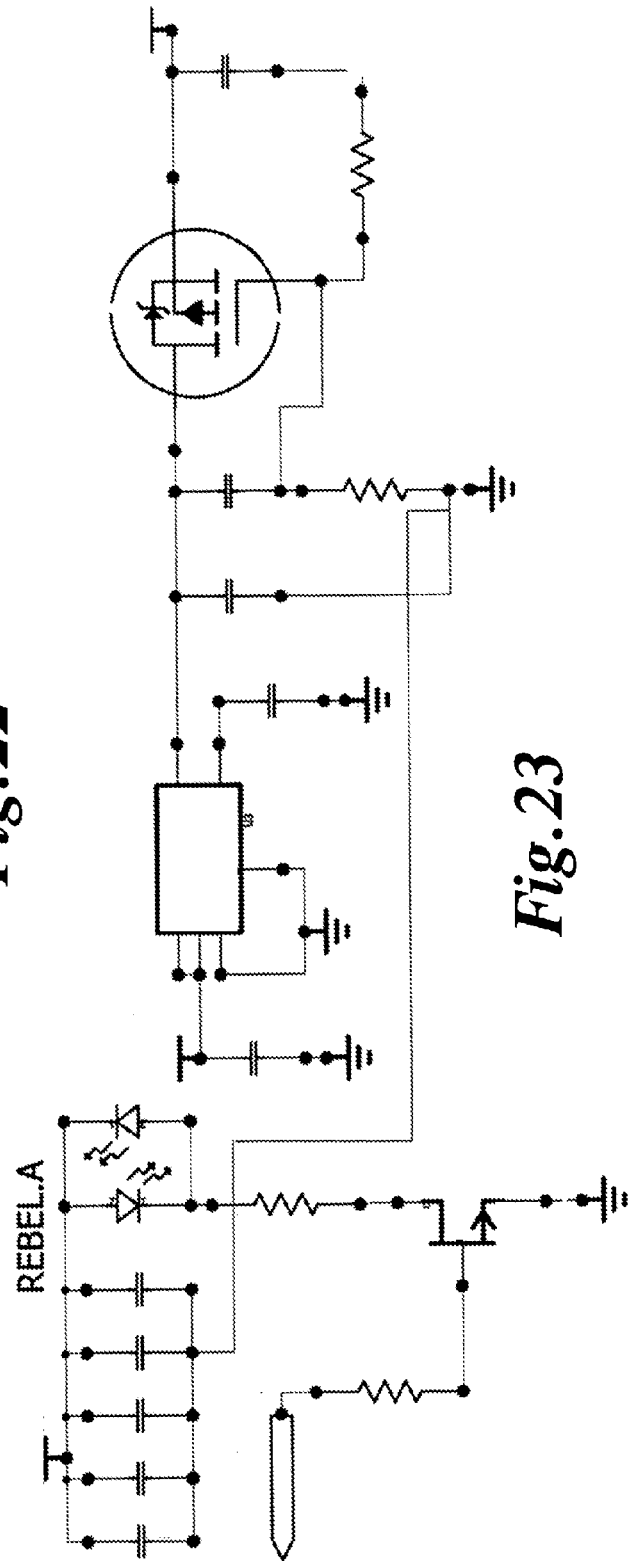
FIG. 23 is a partial electrical schematic of one alternative embodiment of an LED USB Dongle or Key device.
Figure 24:
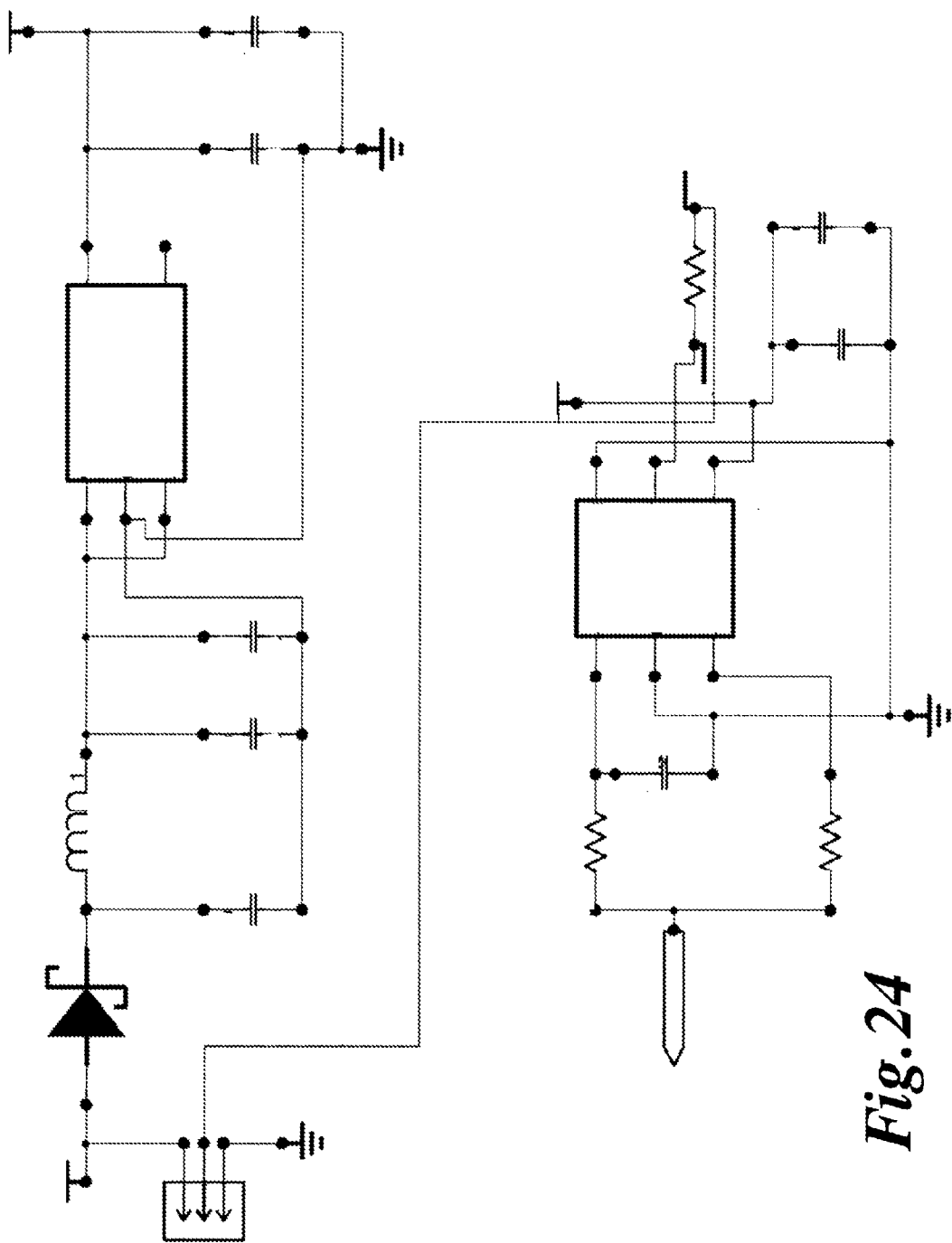
FIG. 24 is a partial electrical schematic of one alternative embodiment of an LED USB Dongle or Key device.
Figure 25:
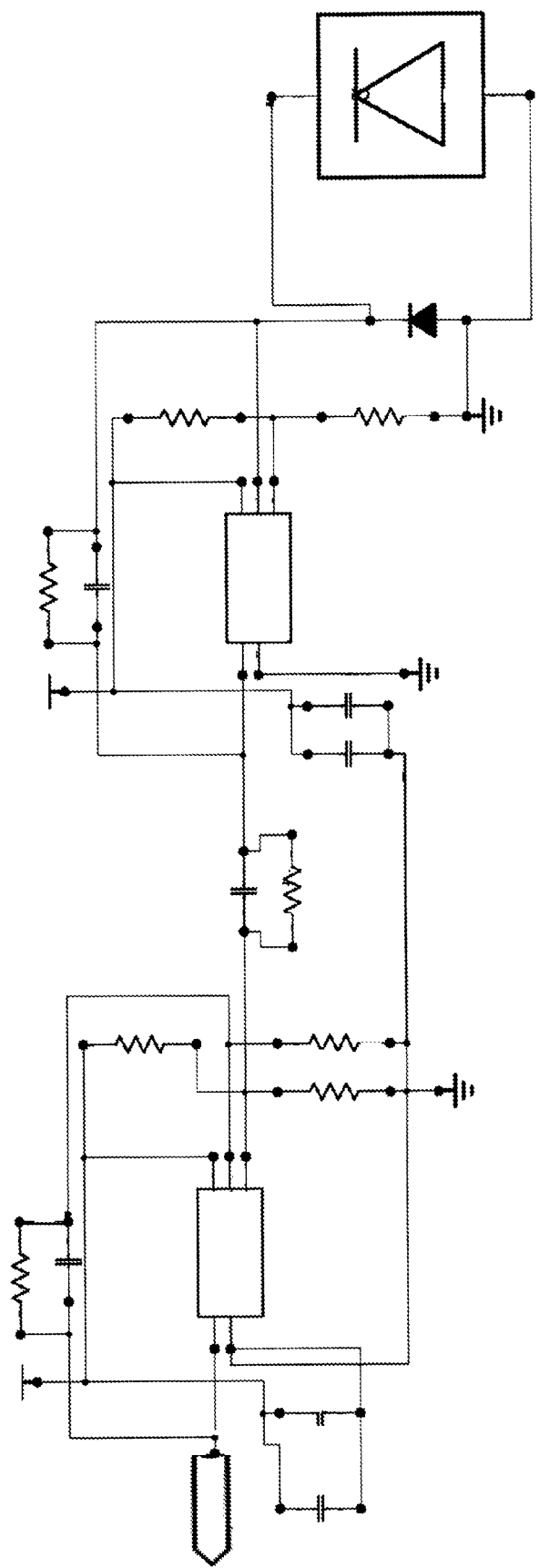
FIG. 25 is a partial electrical schematic diagram of one alternative embodiment of an LED USB Dongle or Key device.
Figure 26:
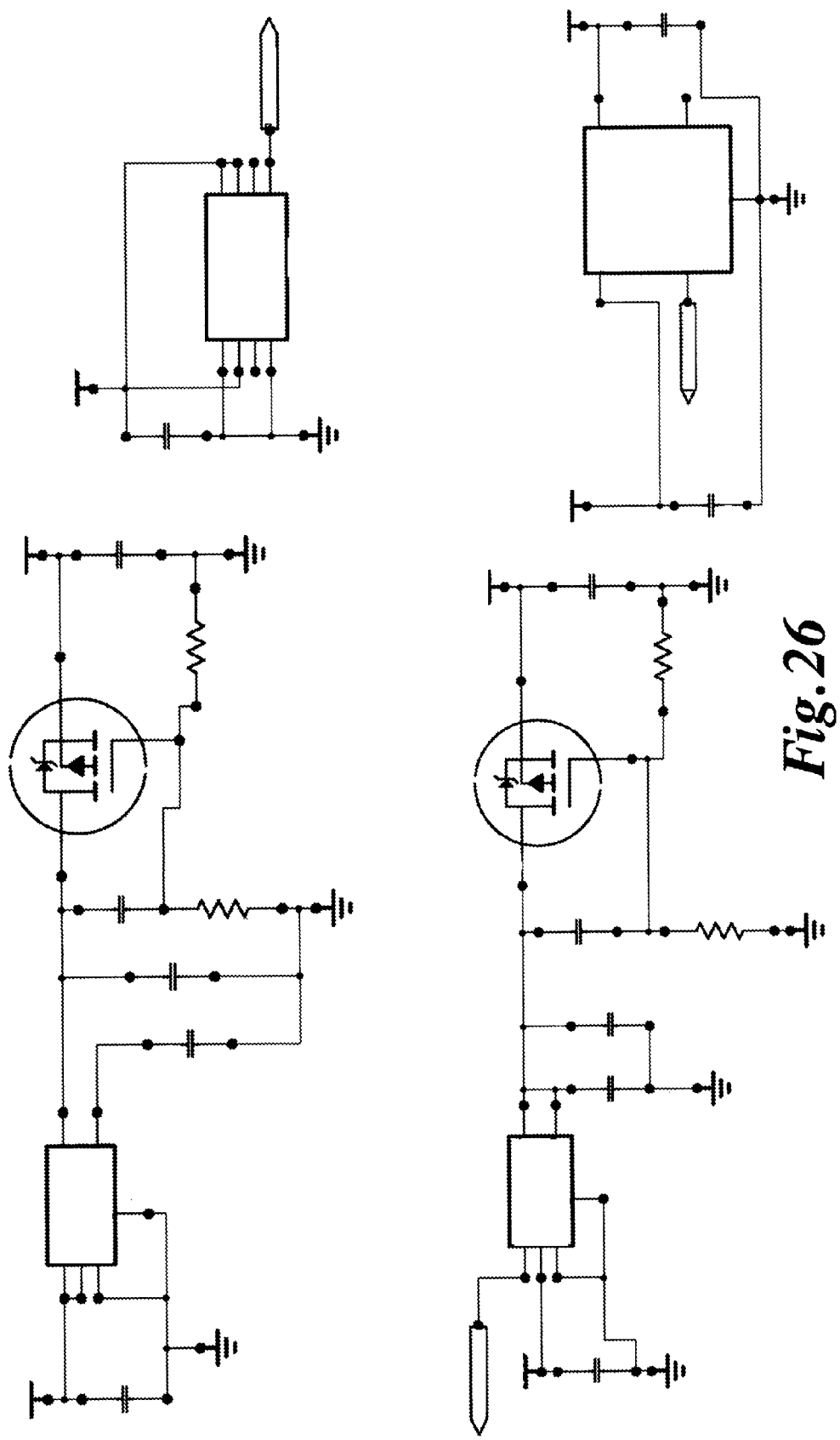
FIG. 26 is a partial electrical schematic of one alternative embodiment of an LED USB Dongle or Key device.
Figure 27A:
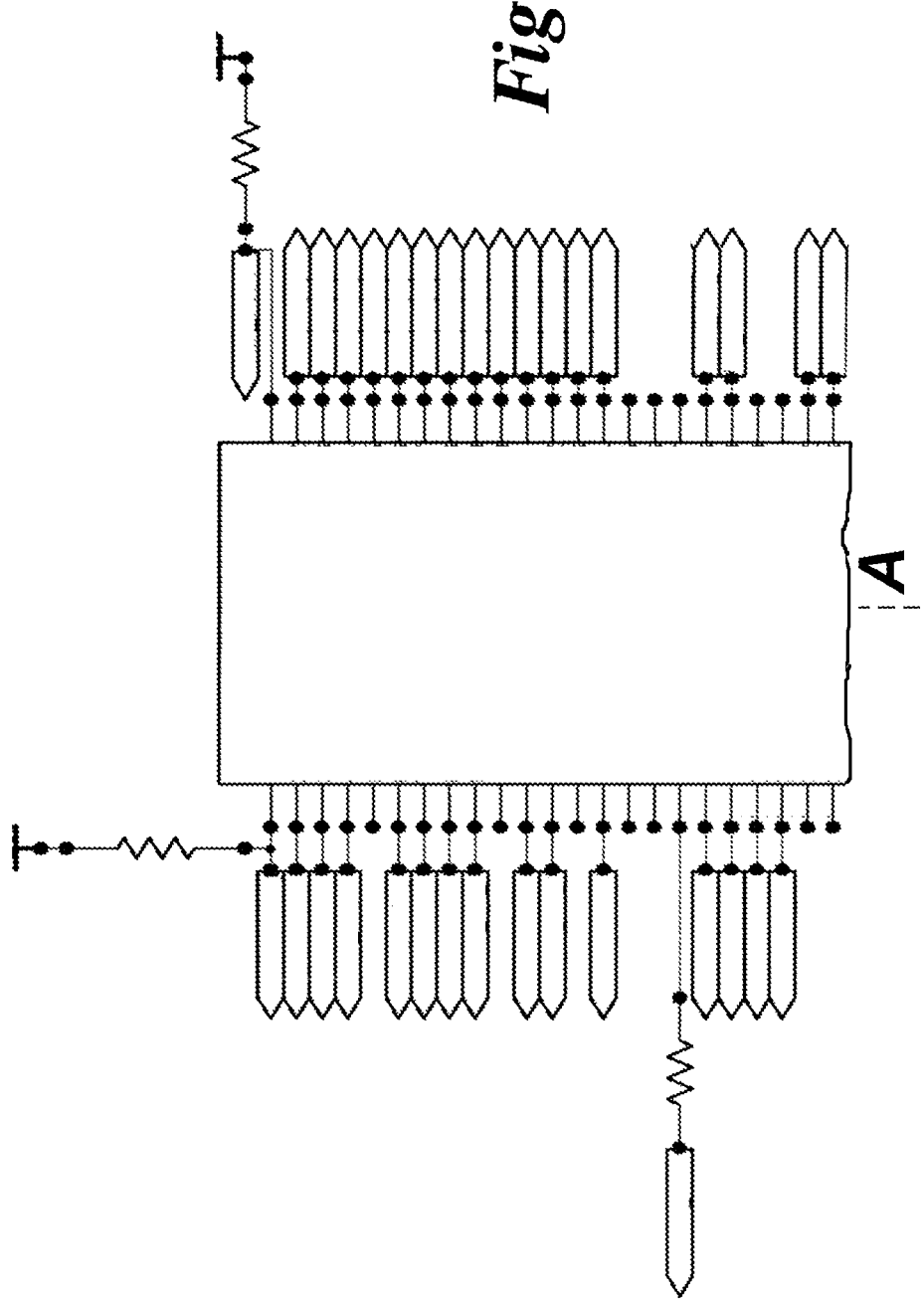
FIG. 27A is a partial electrical schematic of one alternative embodiment of an LED USB Dongle or Key device.
Figure 27B:
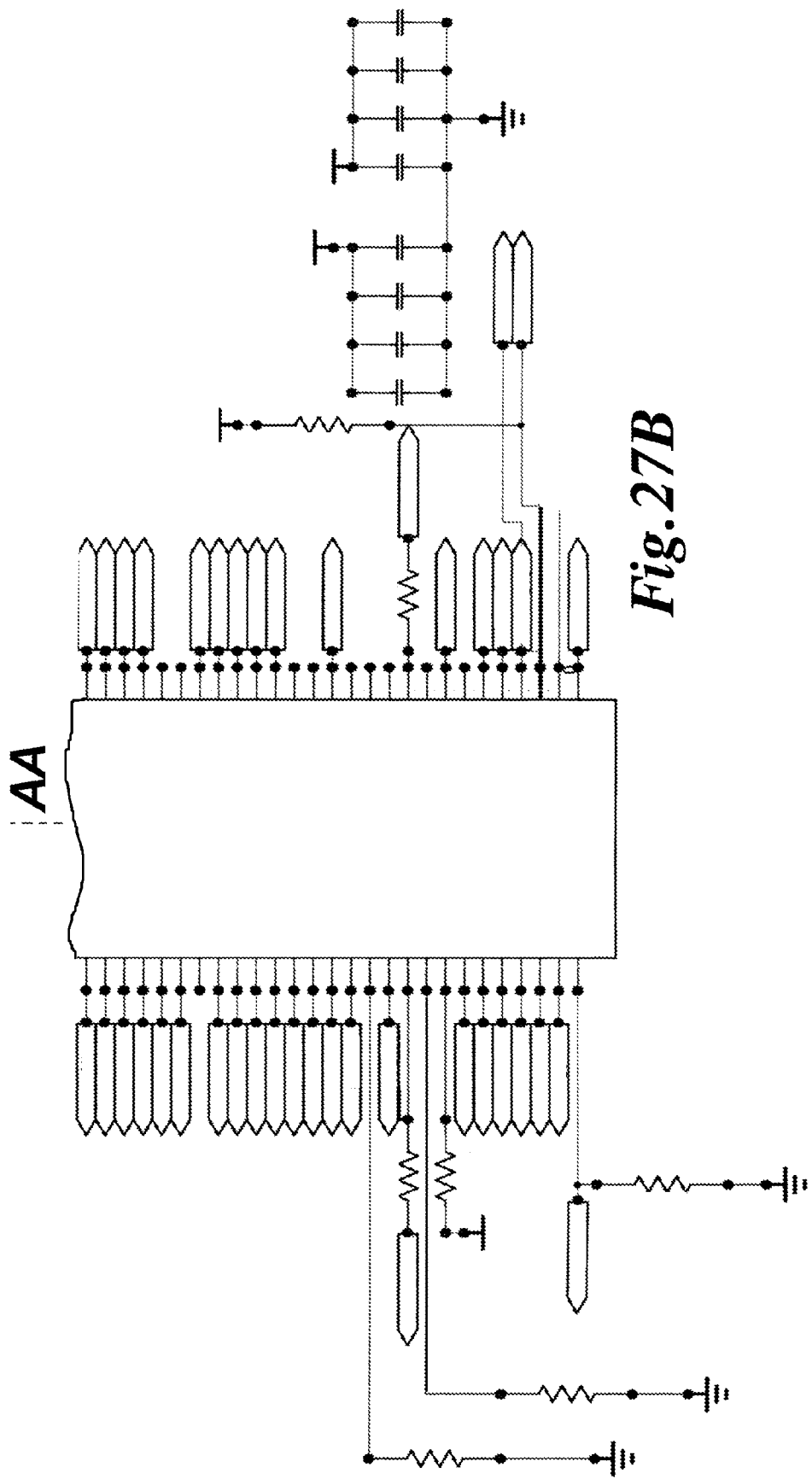
FIG. 27B is a partial electrical schematic of one alternative embodiment of an LED USB Dongle or Key device.
Figure 27C:
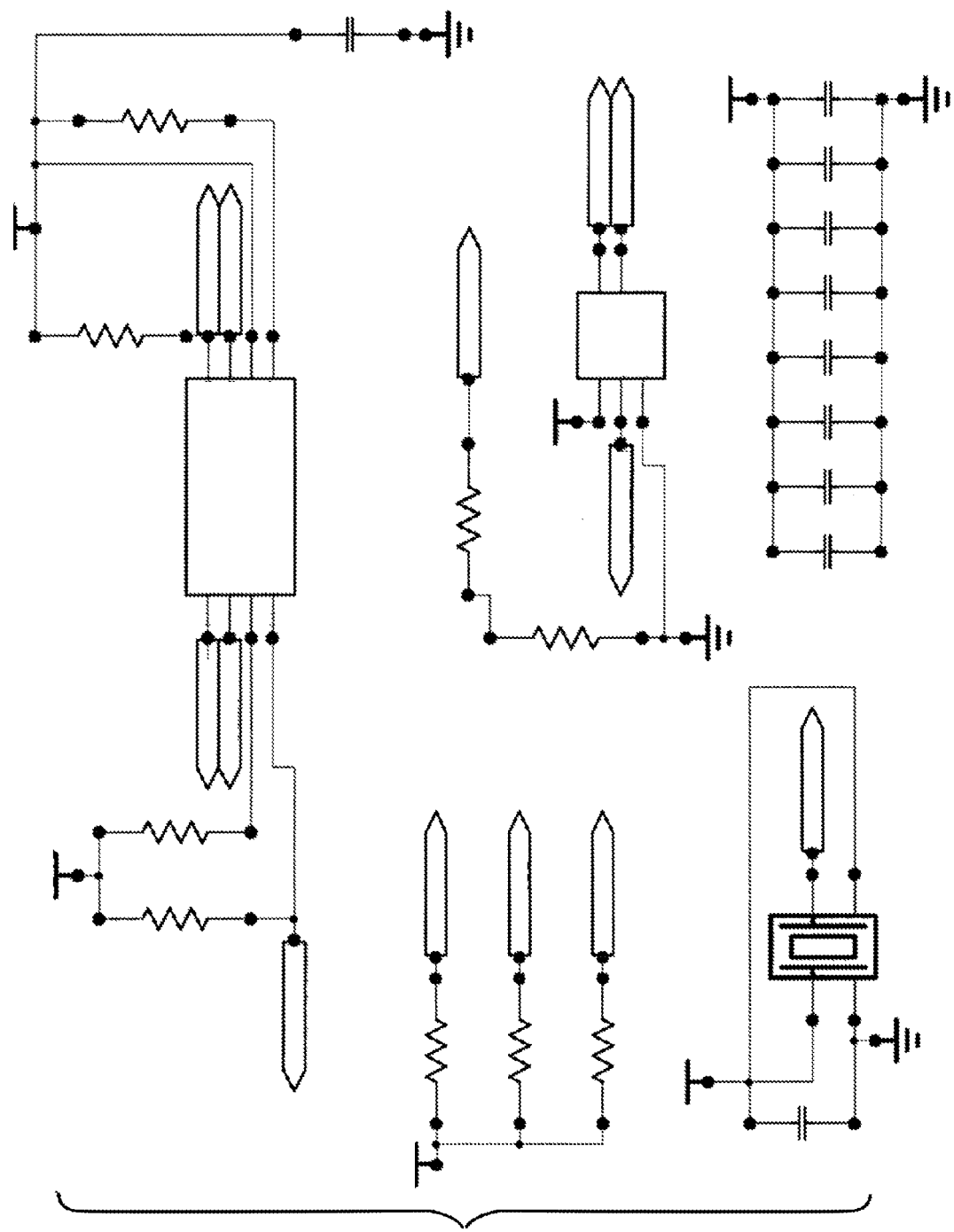
FIG. 27C is a partial electrical schematic of one alternative embodiment of an LED USB Dongle or Key device.

In some embodiments, the major functional components of the Visual Light Modem (VLM) for the dongle or key device are described in the block diagram of FIG. 11.

In some embodiments, the physical pin-out will connect with the other VLM circuitry on the printed circuit board for the FPGA 54. Pin descriptions are detailed in Table 1.

TABLE 1

| Signal Name | Direction | Description |
| --- | --- | --- |
| reset | input | allows external input reset the system |
| ifclk | input | system oscillator signal (50 Mhz) |
| mii_rx_dv | input | Ethernet rx PHY enabled |
| mii_rx_er | input | Ethernet rx PHY error |
| mii_rx_clk | input | Ethernet rx PHY clock |
| mii_tx_clk | input | Ethernet tx PHY clock |
| e_col | input | un used |
| demod_bit_in | input | recovered light signal from receiver circuit |
| sci | input | 12C clock |
| spi_miso | input | SPI master in slave out |
| rx_clk | output | Ethernet statistics clock- unused |
| rx_statistics_vector | output | Ethernet statistics- unused |
| rx_statistics_valid | output | Ethernet statistics- unused |
| tx_clk | output | Ethernet statistics clock- unused |
| tx_statistics_vector | output | Ethernet statistics- unused |
| tx_statistics_valid | output | Ethernet statistics- unused |
| n_rst | output | Ethernet PHY reset |
| mii_tx_en | output | Ethernet tx PHY enable |
| mod_bit_out | output | modulated LED output signal |
| LEFX_RED | output | modulated LED output signal |
| LEFX_GREEN | output | modulated LED output signal |
| LEFX_BLUE | output | modulated LED output signal |
| led1_link | output | receiver sync status |
| led2_act | output | data transfer status |
| led1_1ink_th | output | receiver sync status for thru hole LED |
| led2_act_th | output | data transfer status for thru hole LED |
| led3_hb | output | FPGA heartbeat |
| mdc | output | Ethernet management data input/output clock |
| spi_mosi | output | SPI master out slave in |
| spi_sck | output | SPI clock |
| spi_cso_b | output | SPI enable |
| test_pin_1 | output | test pin out 1 |
| test_pin_2 | output | test pin out 2 |
| mii_txd (3:0) | output | Ethernet tx data interface bus |
| mdio | inout | Ethernet management data input/output |
| sda | inout | 12C data transfer |
| mii_rxd (3:0) | inout | Ethernet rx data interface bus |

In some embodiments, the Xilinx Tri-Mode Ethernet media access controller (MAC) 56 allows the visual light modem to have an Ethernet communications port 58. The MAC core 56 is connected to a PHY device such as the Asix USB to fast Ethernet controller via the Mil interface 62. The client side is connected to a Xilinx local link FIFO 64 which connects to the VLM interface 66.

In some embodiments, the Visible Light Modulator block will accept raw Ethernet packet data from the Local Link FIFO 64. The Local Link will transfer data to the modulator with a width of 8 bits and indicate start-of-frame (SOF) and end-of-frame (EOF) data bytes. The VLM modulator will use this information to keep packets intact as it sends data. Below is an example of the Modulator's packet structure and a description of each field:

| IDLE0 | IDLE1 | SOF0 | SOP0 | Ethernet Packet Data | EOP0 | EOP1 | EOF0 |

IDLE0/IDLE1—Used to keep a synchronized clock reference with the De-Modulator

SOF0—Start-of-frame—indicates that the modulator is receiving the start of an Ethernet frame from the Local Link FIFO SOP0—Start-of-pack t—indicates the first byte of data from the Ethernet packet Ethernet Packet DATA—the remaining Ethernet packet not including the first byte. Could be from 63-1499 bytes in size EOP0/EOP1—indicates that the modulator has received the last data byte of the Ethernet frame from the Local Link FIFO EOF—signifies the end of the current Ethernet frame in the Local Link FIFO The VLM modulator in some embodiments, uses an 8B/10B encoder 66 to achieve a DC balance (50% effective duty cycle) and provides enough state changes to allow the de-modulator 68 to recover the clock 70. The modulated output signal can drive the optical electronics so that an LED can produce light as well as a communications signal. The baud rates may be used for Ethernet communications. In some embodiments, the 8b/10b encoding scheme is only 80% of the actual baud rate due to overhead, so the actual measured data rate may be incrementally slower than the physical setting.

TABLE 2

| VlM Baud Rates | |
| --- | --- |
| Baud Rate (Mb/s) | Data Rate (Mb/s) |
| 50 | 40 |
| 25 | 20 |
| 12.5 | 10 |
| 6.25 | 5 |
| 3.125 | 2.5 |
| 1.5625 | 1.25 |

The Modulator block can be set to act as either a client (PC modem) or a host (LED fixture modem). This selection can be made using the 12C interface coupled with a computing device. The speed can also be changed by utilizing the 12C interface (12C Slave) 72.

TABLE 3

| VLM Modulator pin descriptions | | |
| --- | --- | --- |
| Signal Name | Direction | Description |
| data (7:0) | input | Ethernet data input from FIFO |
| vlm_control_sel0 (7:0) | input | 12C control byte for changing speed, type, etc . . . |
| clk | input | main clock input |
| data_rd_inv | input | data from local link FIFO valid and ready to be read |
| eop_mod_inv | input | end of frame signal from local link |
| reset | input | FIFO block reset |

TABLE 3-continued

| VLM Modulator pin descriptions | | |
| --- | --- | --- |
| Signal Name | Direction | Description |
| sop_mod_inv | input | start of frame signal from local link FIFO |
| data_rdy_inv | output | modulator ready for data from local link FIFO |
| mod_data | output | modulated serial data output sig |

The Visible Light De-Modulator block 68 accepts an 8B/10B encoded signal 66 transmitted from a Modulator. The de-modulator uses the same baud rate settings as the Modulator (see Table 1). The De-Modulator 68 uses an 8B/10B decoder 74 to restructure the received data into the 8 bit format. The De-Modulator 68 then decodes the data structure sent by the Modulator. The decoded data structure as raw Ethernet data is passed into the Local Link FIFO 64 byte-by-byte so that it can be transmitted by the Ethernet MAC 56.

The De-Modulator 68 will also be configured as a client or host depending on the selection made to the modulator. The data rate selection may match the selection made to the Modulator.

TABLE 4

| Visible Light de-modulator pin descriptions | | |
| --- | --- | --- |
| Signal Name | Direction | Description |
| vlm_control_sel0 (7:0) | input | 12C control byte for changing speed, type, etc . . . |
| clk | input | main clock input |
| data_rdy | input | local link FIFO ready for data |
| mod_data | input | modulated input data from receiver |
| reset | input | block reset |
| sys_qsec | input | millisecond pulse |
| sys_sec | input | second pulse |
| vclk | input | secondary main clock |
| byte_rate_l (7:0) | output | lower byte of reported data rate [7:0] |
| byte_rate_m0 (7:0) | output | middle1 byte of reported data rate [15:8] |
| byte_rate_m1 (7:0) | output | middle2 byte of reported data rate [23:16] |
| byte_rate_u (7:0) | output | upper byte of reported data rate [31:24] |
| data (7.0) | output | demodulated data out to local link FIFO |
| vlm_status (1:0) | output | 12C status bits for monitoring functions |
| data_wr | output | write data to local link FIFO |
| eop_demod | output | end of frame to local link FIFO |
| sop_demod | output | start of frame to local link FIFO |
| st_frame_sync | output | status output of data flow |
| st_idle_sync | output | status output of receive sync |
| st_prn_sync | output | unused |

The Ethernet Configuration block 58 is used to configure both the local MAC 56 and the external Asix USB to LAN chip. The Ethernet Configuration block 58 can read and write to the local MAC as a host. The following settings are made to the MAC at initialization of the VLM:

MAC speed maybe set to 100 Mbps

MAC maybe reset due to the speed change

The MDC clock frequency maybe set to 2.5 MHZ for the Management Data Input/Output (MDIO) interface so that the FPGA 54 can communicate with the Ethernet physical layer of the Asix USB to LAN chip.

Ethernet flow control is turned off

Once the MDC clock is running, the Ethernet Configuration block 58 configures the Asix chip by reading and writing to the MDIO. The following settings are made to the Asix PHY at initialization of the VLM or when set using the 12C PC interface (see 12C Slave) 72:

The PHY is powered down.

The PHY is powered up with either the reverse Mil setting which uses the USB as an Ethernet bridge or the embedded PHY which uses the RJ45 jack as an Ethernet bridge.

PHY is reset.

Auto-negotiation is restarted to initialize the PHY.

TABLE 5

Ethernet Configuration pin descriptions

| Signal Name | Direction | Description |
|---|---|---|
| eth_config (7:0) | input | Ethernet configuration byte from 12C |
| host_rd_data (7:0) | input | read data from the PHY register via MDIO |
| clk | input | main clock input |
| host_clk | input | clock from management interface |
| host_miim_rdy | input | MDIO interface complete, ready for next transaction |
| srst | input | block reset |
| st_idle_sync | input | receiver sync indication |
| sys_msec | input | millisecond timer |
| sys_sec | input | second timer |

TABLE 5-continued

Ethernet Configuration pin descriptions

| Signal Name | Direction | Description |
|---|---|---|
| host_addr (9:0) | output | address of register to be accessed |
| host_opcode (1:0) | output | defines operation to be performed over MDIO |
| host_wr_data (31:0) | output | data to write to PHY register via MDIO |
| eth_mrst | output | Ethernet MAC reset |
| eth_prst | output | Ethernet PHY reset |
| host_miim_sel | output | High for MDIO (PHY config), Low for MAC config |
| host_req | output | signals a transaction on the MDIO interface |

The 12C Slave block 72 is used to communicate with an 12C master. The 12C master 76 is located in the Asix USB to LAN chip. This interface allows a PC connected to the USB interface to control several functions and monitor status of the VLM. The 12C slave 72 provides a means to read and write up to 256 8 byte registers. Table 2 shows the current function register map. The registers can be accessed using the VLM Manager program from a Windows 7/XP system.

TABLE 6

12C Slave Descriptions

| Address | R/W | Bits | Register | Name | Description |
|---|---|---|---|---|---|
| 0x00 | R | [7:0] | firmware_rev | Firmware Revision | Starts at 1 and increments with each new revision |
| 0x01 | R | [7:0] | prject_model | Model Name | A-Z, based on phonetic alphabet (Alpha, Bravo, etc . . . ) |
| 0x02 | R | [0] | vlm_status | Idle Sync Status | Led output on when receivers are synced |
| 0x02 | R | [1] | vlm_status | Frame Sync Status | Led output on when data is transferring |
| 0x02 | R | [2] | vlm_status | Heartbeat | Led output on when heartbeat is on (1 second interval) |
| 0x02 | R | [7:3] | vlm_status | Reserved | Reserved |
| 0x03 | R | [7:0] | byte_rate_l | Byte/s Rage | Byte/second data rate [7:0] |
| 0x04 | R | [7:0] | byte_rate_m0 | Byte/s Rage | Byte/second data rate [15:8] |
| 0x05 | R | [7:0] | byte_rate_m1 | Byte/s Rage | Byte/second data rate [23:16] |
| 0x06 | R | [7:0] | byte_rate_u | Byte/s Rage | Byte/second data rate [31:24] |
| 0x80 | R/W | [7:0] | light_control | Light Adjustment Local | Adjust intensity of light from 0 (off)- FF (full on) |
| 0x81 | R/W | [3:0] | vlm_control_sel0 | Speed Selection | Speed selection (Mb/s): 0001-(12), 0010-(6), 0011-(3), 0100-(1.5) |
| 0x81 | R/W | [4] | vlm_control_sel0 | Encoding Selection | 0-Manchester, 1- 8B/10B |
| 0x81 | R/W | [5] | vlm_control_sel0 | Remote Modem Output | 0-remote mod/demod off, 1- remote mod/demod on |
| 0x81 | R/W | [6] | vlm_control_sel0 | Host or Client selection | 0-host, 1-client |
| 0x81 | R/W | [7] | vlm_control_sel0 | Test Pattern Selection | 0-normal data, 1- mod sends test pattern |
| 0x82 | R/W | [0] | vlm_control_sel1 | Software Rest | 0-running, 1-reset (will self-clear) |
| 0x82 | R/W | [7:1] | vlm_control_sel1 | Reserved | Reserved |
| 0x83 | R/W | [7:0] | vlm_control_sel2 | Reserved | Reserved |
| 0x84 | R/W | [7:0] | vlm_control_sel3 | Reserved | Reserved |

TABLE 6-continued

12C Slave Descriptions

| Address | R/W | Bits | Register | Name | Description |
|---|---|---|---|---|---|
| 0x85 | R/W | [0] | eth_control_sel | RJ45 or Rev-Mll | Select Ethernet communications channel; 0- |
| 0x85 | R/W | [7:1] | eth_control_sel | Reserved | Reserved |
| 0x86 | R/W | [7:0] | light_con_remote | Light Adjustment Remote | Adjust intensity of light from 0 (off)-FF (full on) |

The 12C Slave block 72 consists of the physical layer connection, and strips the data structure into its components which allows the device address, register address and data to be identified. The next sub block is the register interface 78. Once the appropriate register has been identified at the serial interface 82, the register interface 78 writes or reads the data to or from the function register that is associated with a control or status byte.

TABLE 7

12C Slave pin descriptions

| Signal Name | Direction | Description |
|---|---|---|
| mem_to_reg (7:0) | input | read data byte from SPI memory-written to appropriate register |
| myReg*** (7:0) | in/out | read/write or read only regisers to store control/status data |
| clk | input | main clock |
| read_strobe | input | data read from SPI master |
| rst | input | block reset |
| sci | input | 12C clock |
| write_to_reg | input | write data from SPI memory to appropriate register enable |
| spi_addr (7:0) | output | output appropriate memory address based on 12C input address |
| spi_write_data (7:0) | output | 12C data in to write out to SPI memory |
| sda | output | 12C data transfer |

The SPI Master block 76 is used to communicate with the flash memory 84 located in circuit. This allows the control data written from the 12C Slave 72 to be saved into non-volatile memory. Upon a power cycle the settings will be read and recovered. The SPI Master block 76 consists of two sub blocks. The first is the PicoBiaze Processor 86 which is a Xilinx 8-Bit embedded microcontroller. The microcontroller provides the SPI bus and data processing necessary to communicate with the flash memory 84. The second block is the Program ROM 88. This block consists of an assembly file converted to VHDL. This ROM block contains the user program file for the microcontroller.

TABLE 8

SPI Master pin descriptions

| Signal Name | Direction | Description |
|---|---|---|
| spi_addr (7:0) | input | input appropriate memory address based on 12C output address |
| spi_write_data (7:0) | input | SPI memory data in from write out of 12C |

TABLE 8-continued

SPI Master pin descriptions

| Signal Name | Direction | Description |
|---|---|---|
| spi_miso | input | serial data - master in slave out |
| sys_clk | input | main clock |
| mem_to_reg (7:0) | output | output data byte to 12C slave |
| read_strobe | output | PicoBlaze controller indicates data ready to read from input port |
| reset | output | reset PicoBlaze controller - unused |
| spi_cso_b | output | SPI enable |
| spi_mosi | output | serial data - SPI master out slave in |
| spi_slk | output | SPI clock |
| write_strobe | output | signifies PicoBlaze write from output port |
| write_to_reg | output | write data from SPI memory enable |

The System Timers block 90 uses the input clock to derive microsecond, millisecond and second timers. These timers are used throughout the FPGA 54 design to limit the number of local timers necessary in the design.

TABLE 9

System Timers pin description

| Signal Name | Direction | Description |
|---|---|---|
| clk | input | main clock |
| rst | input | block reset |
| sys_tick (63:0) | output | raw clock tick at main clock frequency |
| sys_debounce | output | debouncer |
| sys_msec | output | millisecond timer |
| sys_sec | output | second timer |
| sys_usec | output | microsecond timer |

The Heart Beat block 92 is used to generate a one second pulse. This pulse is output to a visible status LED to validate FPGA 54 operation.

TABLE 10

Heart Beat pin description

| Signal Name | Direction | Description |
|---|---|---|
| clk | input | main clock |
| srst | input | block reset |
| sys_msec | input | millisecond timer |
| sys_sec | input | second timer |
| hb | output | heartbeat signifies system alive |

A Key can be connected to a computing or electronic device (laptop, desktop, etc.) via a USB connection. When a light link is present between a Key and a Fixture, the laptop/desktop or other electronic device will get a network connection. The laptop/desktop or other electronic device views this connection as a direct Ethernet connection. In some embodiments, first time a Key is connected to a device, that device should already have an internet connection established, so that the device can download and install the necessary ASIX driver for the newly discovered hardware-Key. In some embodiments, the driver code may be embedded in the key, in order to eliminate this one-time setup step.

In alternative embodiments, a dongle or key device is depicted in FIGS. 6 through 9. In the alternative embodiments depicted in FIGS. 6 and 7 the dongle or key device may include a cable receiver for interface with an electronic device to provide LED pulsed light communication and information/data transmission. In the alternative embodiments depicted in FIGS. 8 and 9 the dongle or key device may include a USB plug for interface with an electronic device to provide LED pulsed light communication and information/data transmissions.

Figure 8:
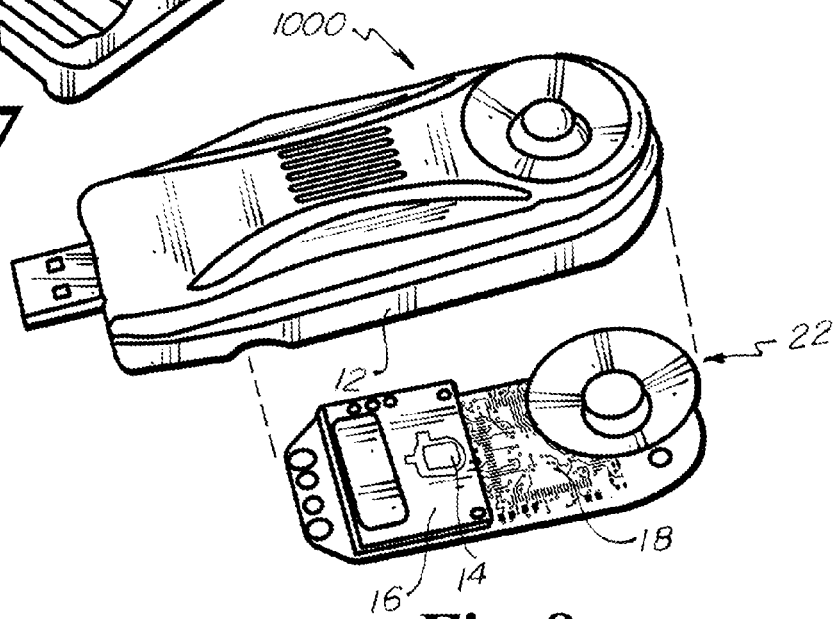
FIG. 8 is an alternative isometric exploded view of one embodiment of an LED USB Dongle or device.

In some embodiments as depicted in FIG. 8, the dongle or key device 1000 may include an outer casing 12, a photo detector 14, a receiver circuit board 16, a transmitter circuit board 18, and an LED assembly 22.

Figure 10:
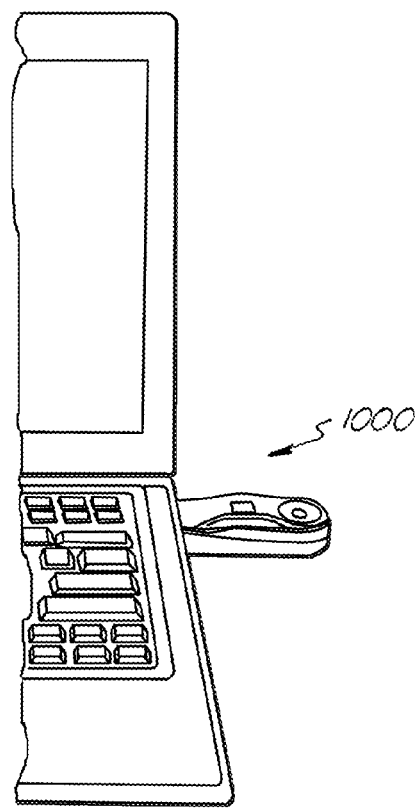
FIG. 10 is an alternative isometric view of one embodiment of an LED USB Dongle or device as engaged to one embodiment of an electronic computing device.
Figure 12:
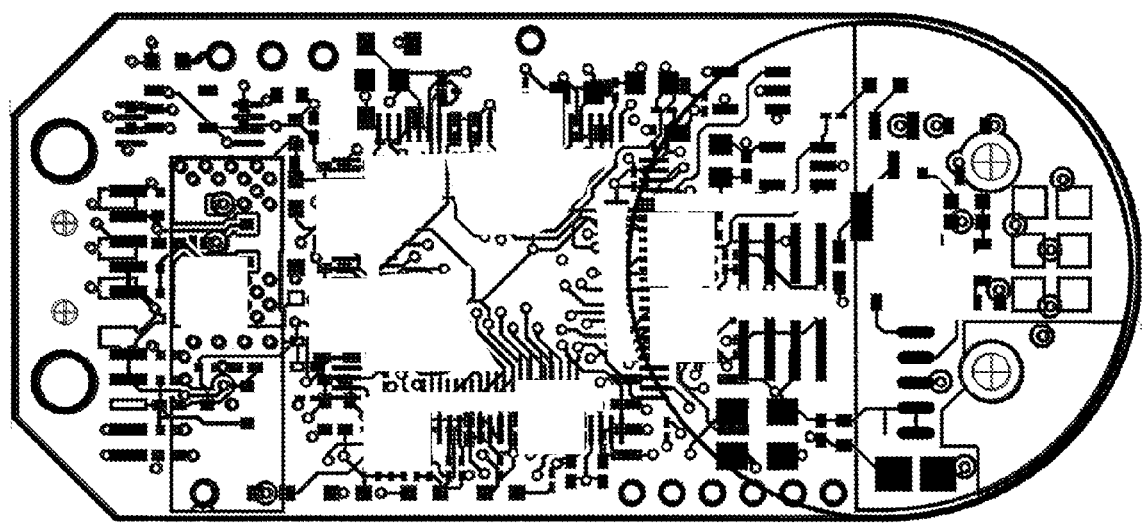
FIG. 12 is an alternative top view of one embodiment of a circuit board as used in an LED USB Dongle or Key device.

In at least one alternative embodiment, a dongle or key device 1000 is interfaced with a laptop computer as depicted in FIG. 10.

Figure 30:
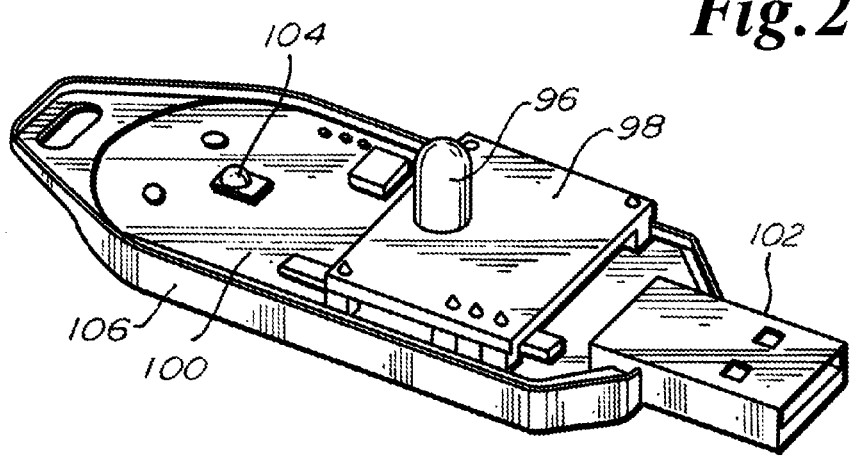
FIG. 30 is a detail partial cut away isometric view of one alternative embodiment of an LED USB Dongle or Key device as depicted in FIG. 28.
Figure 31:
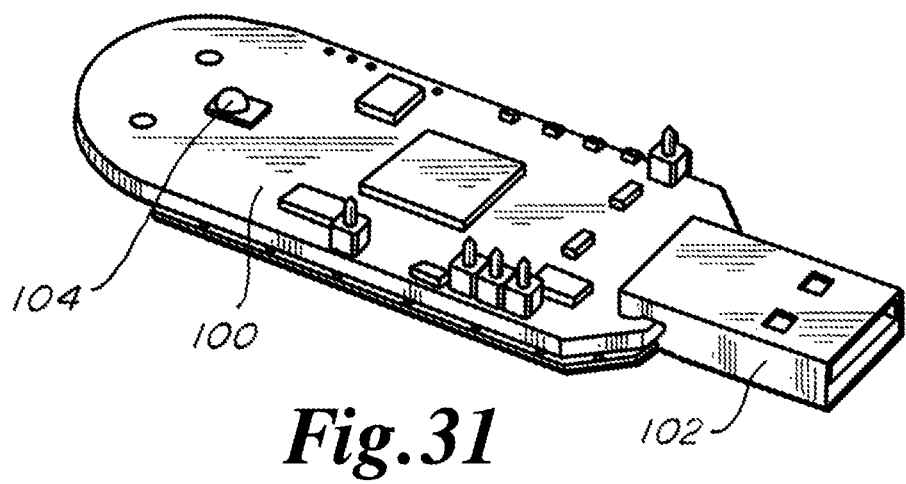
FIG. 31 is a detail partial cut away isometric view of one alternative embodiment of an LED USB Dongle or Key device as depicted in FIG. 28.
Figure 32:
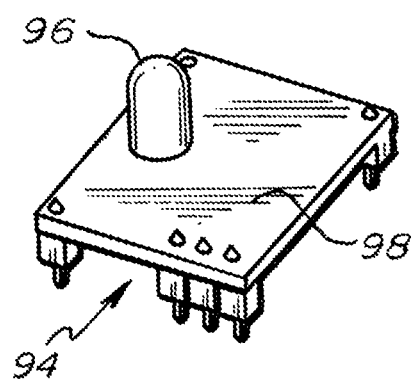
FIG. 32 is a detail isometric view of a receiver unit of one alternative embodiment of an LED USB Dongle or Key device depicted in FIG. 28.

In at least one embodiment as depicted in FIGS. 28 through 32 a dongle or key device 1000 will include the components of a visible light transceiver generally referred to by reference numeral 94. (FIG. 32)

In some embodiments the transceiver 94 includes a photodetector/photodiode 96 and a processor/controller 98 which may be formed of one or more layered circuit boards. In some embodiments the photodetector/photodiode 96 and the processor/controller 98 are in electrical communication with a source of electricity and are in communication with a main circuit board processor/controller 100. (FIGS. 32, 31)

In at least one embodiment as depicted in FIG. 31 the main circuit board processor/controller 100 includes and is in communication with a USB port 102. The main circuit board processor/controller 100 also includes an LED 104. The LED 104 is in communication with the main circuit board 100 which functions as a transmitter to regulate and control the embedded flashing of the LED 104 to generate an optical embedded communication signal or information/data transmission. In at least one embodiment, the processor/controller 98 of the receiver 94 is engaged to, is in electrical contact, and is in communication with main board 100.

In at least one embodiment as depicted in FIG. 30, the main board 100 having the LED 104 is connected to the receiver processor/controller 98. Both the receiver 94 and the transmitter main board 100 are disposed in a lower casing 106.

Figure 29:
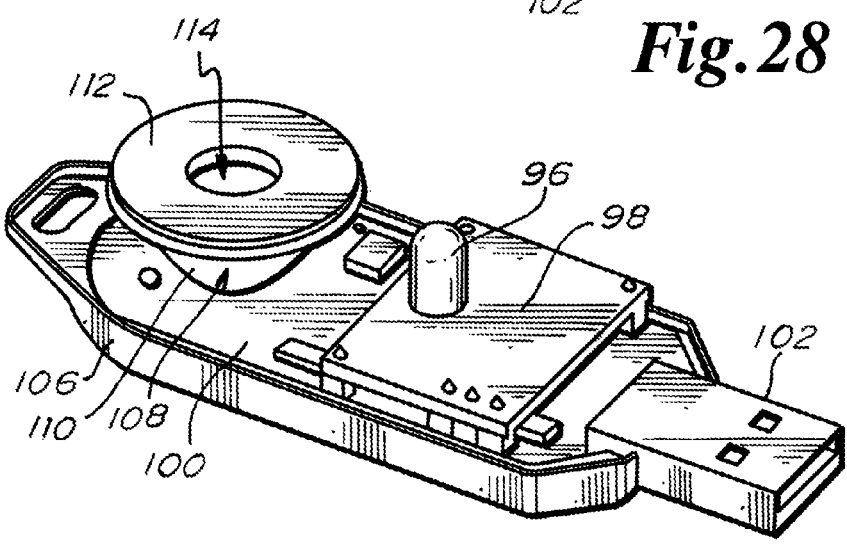
FIG. 29 is a detail partial cut away isometric view of one alternative embodiment of an LED USB Dongle or Key device depicted in FIG. 28.

In at least one embodiment as depicted in FIG. 29, a lens assembly 108 is engaged to the transmitter main board 100 over the LED 104. In some embodiments the lens assembly 108 is formed of a conical member 110 which in some embodiments may have a polished interior surface to reflect light into a focused path or direction. In some embodiments, the interior of the lens assembly 108 may be parabolic in shape to reflect light transmitted from the LED 104 along a desired path or direction.

In some embodiments, the lens assembly 108 includes an upper lens 112 which is engaged to the upper portion of the conical member 110. In some embodiments, the upper lens 112 includes a central opening 114 which allows passage of light as transmitted/emitted from the LED 104 therethrough. In some embodiments, the upper lens 112 may have filtering and/or focusing properties during the transmission of light from the LED 104.

Figure 28:
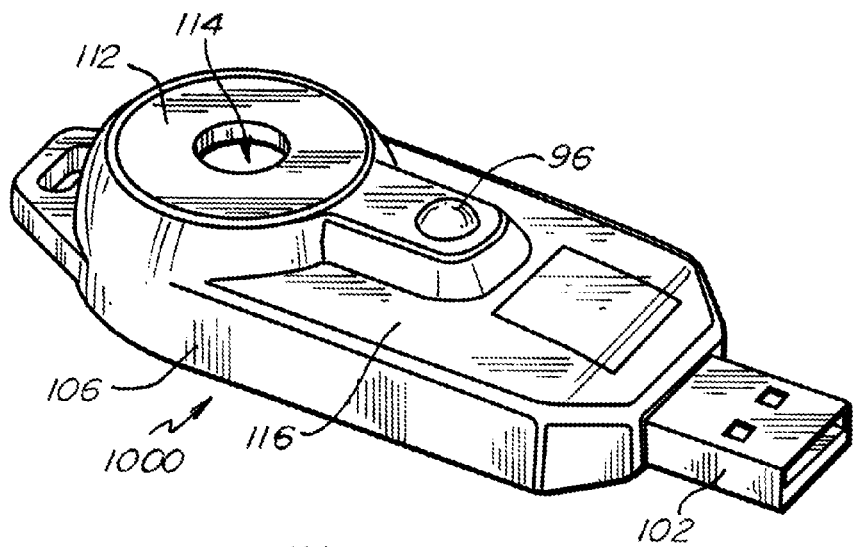
FIG. 28 is an isometric view of one alternative embodiment of an LED USB Dongle or Key device.

In some embodiments as depicted in FIG. 28, the key or dongle 1000 includes an upper casing 116 which is releasably attached or engaged to the lower casing 106. In some embodiments, the upper portion of the photo detector/photo diode 96 extends upwardly above the upper casing 116. In some embodiments, the upper casing 116 is engaged to the upper portion of the conical member 110 or the lens assembly 108.

In some embodiments, a ball lens or semi-spherical lens may be disposed above LED 104 within the lens assembly 108 or conical member 110. In other embodiments, another type of lens is disposed above LED 104.

Incorporated by reference in this application include U.S. Pat. Nos. 6,879,263, 7,046,160, 7,439,847, 7,902,978, 8,188,861, 8,188,878, 8,188,879, 8,330,599, 8,331,790, 8,542,096, 8,543,505, 8,571,411, 8,593,299, U.S. application Ser. Nos. 10/646,853, 11/433,979, 12/032,908, 12/126,227, 12/126,342, 12/126,469, 12/126,647, 12/750,796, 13/427,358, 13/479,556, 13/706,864, 13/972,294, 14/033,014, 14/050,759, 14/050,765, and U.S. Provisional Application Ser. Nos. 60/248,894, 60/405,379, 60/405,592, 61/778,672, 61/783,501, 61/819,861, 61/867,731, 61/927,638, 61/927,663.

This application is also related to the patent application entitled "Method of Measuring and Provision of Lumens," U.S. application Ser. No. 14/207,934, filed Mar. 13, 2014, which is incorporated by reference herein in its entirety. The present application is also related to the patent application entitled "LED Light Fixture," U.S. application Ser. No. 14/207,955, filed Mar. 13, 2014, which is incorporated by reference herein in its entirety. Also the present application is related to the patent application entitled "LED Light Control and Management System," U.S. application Ser. No. 14/208,125, filed Mar. 13, 2014, which is incorporated by reference herein in its entirety.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

In addition to being directed to the embodiments described above and claimed below, the present invention is further directed to embodiments having different combinations of the features described above and claimed below. As such, the invention is also directed to other embodiments having any other possible combination of the dependent features claimed below.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

What is claimed is:

1. A light emitting diode (LED) light communication device comprising:
    a portable housing comprising at least one optical transceiver comprising at least one LED and at least one photodetector, said housing further comprising a universal serial bus interface in communication with said at least one optical transceiver,
    said universal serial bus interface being constructed and arranged for engagement to, and communication with a universal serial bus receiving port of an electronic device,
    said optical transceiver being further constructed and arranged for transmission of at least one transmitted light signal and receipt of at least one received light signal, said at least one transmitted light signal and said at least one received light signal each comprising a plurality of rapid flashes of light, said rapid flashes of light having a frequency which is not observable to an individual, wherein said rapid flashes of light are configured for transmission of information or data, said at least one received light signal being embedded within illumination, said at least one transmitted light signal comprising at least one device identifier and said at least one received light signal comprising at least one location identifier, said at least one location identifier comprising at least one origin location identifier,
    said optical transceiver further comprising at least one of a main circuit board, a receiver circuit board, and at least one lens disposed over said at least one light emitting diode wherein said communication device has a first state wherein said universal serial bus interface is unengaged to said universal serial bus receiving port and a second state wherein said universal serial bus interface is engaged to said universal serial bus receiving port, further wherein said at least one optical transceiver and said universal serial bus interface are constructed and arranged to establish an optical link for said at least one transmitted light signal and said at least one received light signal for said electronic device.

2. The LED light communication device of claim 1, said optical transceiver further comprising a converter.

3. The LED light communication device of claim 2, said optical transceiver further comprising buffering circuitry.

4. The LED light communication device of claim 3, said optical transceiver further comprising isolation circuitry.

5. The LED light communication device of claim 4, said optical transceiver further comprising modulation circuitry.

6. The LED light communication device of claim 4, said optical transceiver further comprising amplification circuitry.

7. The LED light communication device of claim 1, said at least one optical transceiver further comprising a lens assembly comprising at least one reflective member and at least one lens disposed adjacent to said at least one reflective member.

8. The LED light communication device of claim 1, said at least one optical transceiver further comprising a lens assembly comprising an upper lens, said upper lens comprising an opening.

9. The LED light communication device of claim 1, said information or data comprising global positioning system information.

10. The LED light communication device of claim 9, said information or data comprising at least one intermediate optical transceiver location identifier.

11. A light emitting diode (LED) light communication device comprising:
    a housing comprising at least one optical transceiver comprising at least one LED and at least one photodetector, said housing further comprising a universal serial bus interface in communication with said at least one optical transceiver,
    said universal serial bus interface being constructed and arranged for engagement to, and communication with a universal serial bus receiving port of an electronic device,
    said optical transceiver being further constructed and arranged for transmission of at least one transmitted light signal and receipt of at least one received light signal, said at least one transmitted light signal and said at least one received light signal each comprising a plurality of rapid flashes of light said rapid flashes of light having a wavelength in the observable spectrum, said rapid flashes of light having a frequency which is not observable to an individual, wherein said rapid flashes of light are configured for transmission of information or data, said at least one received light signal being embedded within illumination, said at least one transmitted light signal comprising at least one device identifier and said at least one received light signal comprising at least one location identifier, said at least one location identifier comprising at least one origin location identifier,
    said optical transceiver further comprising at least one lens disposed over said at least one light emitting diode wherein said communication device has a first state wherein said universal serial bus interface is unengaged to said universal serial bus receiving port and a second state wherein said universal serial bus interface is engaged to said universal serial bus receiving port, further wherein said at least one optical transceiver and said universal serial bus interface are constructed and arranged to establish an optical link for said at least one transmitted light signal and said at least one received light signal for said electronic device.

12. The LED light communication device of claim 11, said information or data comprising global positioning system information.

13. The LED light communication device of claim 12, said information or data comprising at least one intermediate optical transceiver location identifier.

14. The LED light communication device of claim 11, said at least one optical transceiver further comprising a lens assembly comprising at least one reflective member wherein said at least one lens is disposed adjacent to said at least one reflective member.

15. The LED light communication device of claim 11, said at least one optical transceiver further comprising a lens assembly comprising an upper lens, said upper lens comprising an opening.

* * * * *